United States Patent [19]
Woodman

[11] Patent Number: 6,026,475
[45] Date of Patent: Feb. 15, 2000

[54] METHOD FOR DYNAMICALLY REMAPPING A VIRTUAL ADDRESS TO A PHYSICAL ADDRESS TO MAINTAIN AN EVEN DISTRIBUTION OF CACHE PAGE ADDRESSES IN A VIRTUAL ADDRESS SPACE

[75] Inventor: Larry William Woodman, Nottingham, N.H.

[73] Assignee: Digital Equipment Corporation, Houston, Tex.

[21] Appl. No.: 08/978,932

[22] Filed: Nov. 26, 1997

[51] Int. Cl.[7] ........................................... G06F 12/00
[52] U.S. Cl. ..................... 711/202; 711/200; 711/203; 711/3
[58] Field of Search ........................ 711/3, 154, 200, 711/202, 203, 204, 209, 210, 118

[56] References Cited

U.S. PATENT DOCUMENTS

| | | | |
|---|---|---|---|
| 4,563,737 | 1/1986 | Nakamura et al. | 711/202 |
| 5,297,265 | 3/1994 | Frank et al. | 711/202 |
| 5,428,758 | 6/1995 | Salsburg | 711/165 |
| 5,522,045 | 5/1996 | Sandberg | 709/215 |
| 5,592,625 | 1/1997 | Sandberg | 711/147 |
| 5,699,539 | 12/1997 | Garber et al. | 711/2 |
| 5,881,302 | 3/1999 | Omata | 712/2 |
| 5,890,201 | 3/1999 | McLellan et al. | 711/108 |

*Primary Examiner*—Tuan V. Thai
*Attorney, Agent, or Firm*—Hamilton, Brook, Smith & Reynolds

[57] ABSTRACT

A method and apparatus for dynamically updating virtual to physical address mappings in order to reduce cache thrashing is disclosed in an example computer system having a memory apportioned into a number of pages. A cache is included in the computer system to store a subset of the pages of memory. Each of the pages of memory is addressed by a physical address that includes a cache page address portion. The pages of cache memory are accessed using a cache page address, which corresponds to the cache page address portion of the physical address of a corresponding page of memory. The disclosed system monitors the activity of virtual addresses and uses the activity of virtual addresses to increment cache page address activity counters. The cache page address activity counters are monitored to identify those cache page addresses that are frequently being accessed within a process to identify potential performance problems, such as thrashing. When a cache page address activity count has exceeded a pre-determined threshold, a virtual address associated with that cache page address is mapped to a different physical address having a different cache page address. The new cache page address that is selected for remapping purposes is selected to maintain an even distribution of cache page addresses on a system and process level. The physical page formerly mapped to the virtual address that was associated with a highly active cache page address is returned to a free list of the system, for use by another process. With such an arrangement, adjustments may be made to the virtual to physical translations during execution of a given process in order to improve the overall performance of the process and the overall system.

13 Claims, 18 Drawing Sheets

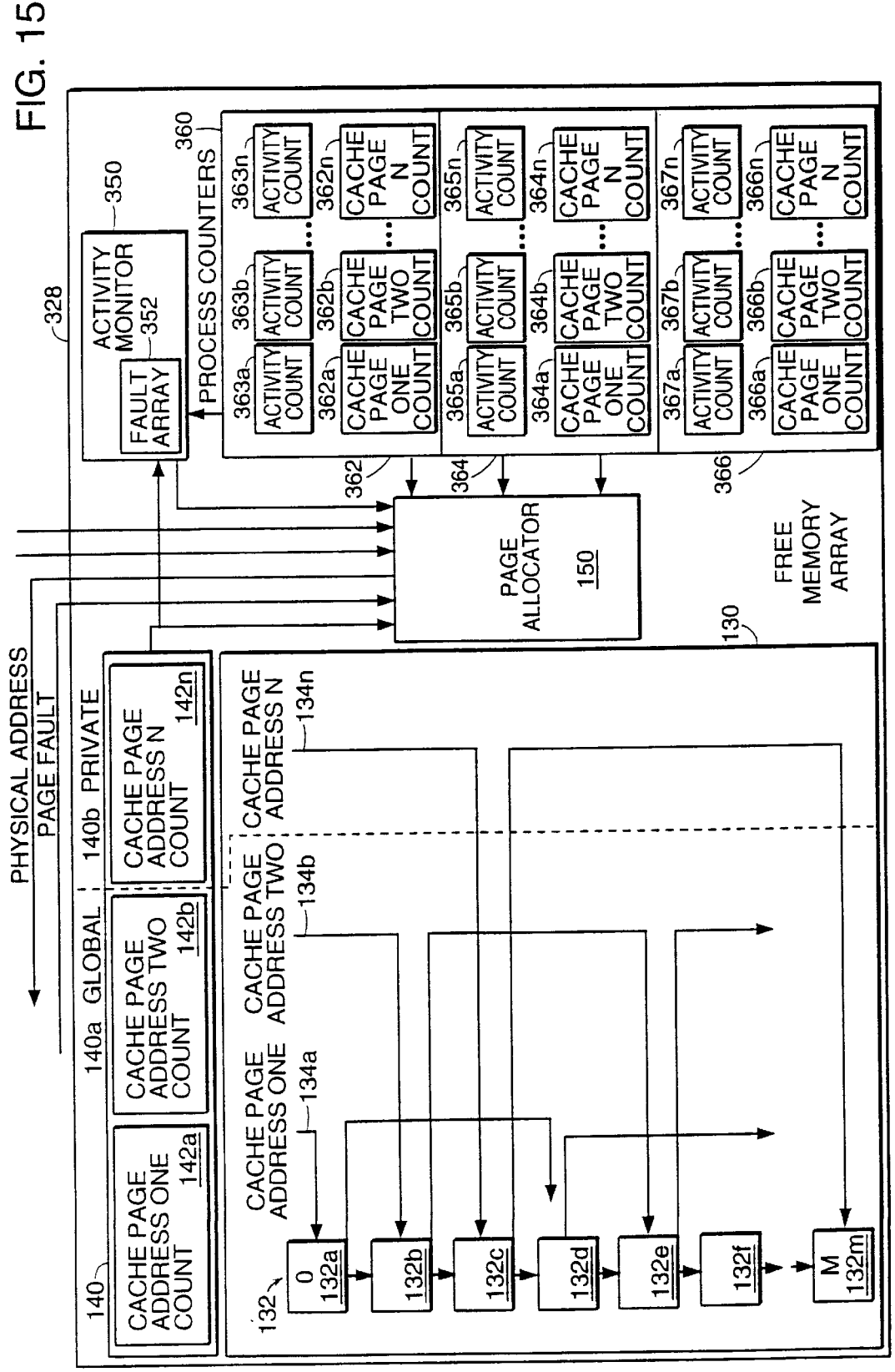

METHOD FOR DYNAMICALLY REMAPPING A VIRTUAL ADDRESS TO A PHYSICAL ADDRESS TO MAINTAIN AN EVEN DISTRIBUTION OF CACHE PAGE ADDRESSES IN A VIRTUAL ADDRESS SPACE

FIELD OF THE INVENTION

This invention relates in general to computer systems and more specifically to a method for optimizing memory performance in a computer system.

BACKGROUND OF THE INVENTION

As is known in the art, a computer system may include a central processing unit that operates on instructions and data received from a coupled memory device. As data and instructions are required by the central processing unit, they are transferred from the memory to the central processing unit.

The latency inherent in obtaining data from the memory device may be quite large. Accordingly, smaller, faster memories, referred to as caches, are typically placed between the memory and the central processing unit. Caches provide temporary storage of portions of memory that are required by the central processing unit. Because the caches are faster than the memory and located relatively closer to the central processing unit, references to the cache are serviced faster than references to the memory. Accordingly, the use of caches increases the overall performance of the computer system by reducing the latency associated with accessing memory data and instructions.

Because the cache is smaller than the memory and stores only a subset of the memory data, when the central processing unit requests an item of memory data it may occur that the item of memory data is not located in the cache. When a request is made for data that is not in the cache, the request is said to 'miss' in the cache. When there is a miss in the cache, the item of memory data is retrieved from the memory and stored in the cache. Thus, the full latency associated with obtaining the item of memory data is incurred for requests that miss in the cache. It is evident therefore that it is desirable to minimize the number of cache misses that occur during operation.

There are a variety of cache architectures, some of which are designed to minimize the number of cache misses that occur during operation. In general, in all of the architectures, the cache is generally apportioned into a number of blocks, where each block comprises a fixed number of bytes of data. Each block of data is a subset of a page of physical memory. Data and instructions associated with processes are allocated pages of physical memory as the processes are introduced into the system.

In a direct mapped cache architecture, when a block of data is copied to the cache, and for subsequent references, selected bits of the physical address of the page at which the block resides are used to form an index to the cache. Because the index is only a part of the physical address, many blocks may map to the same index in the cache. Because multiple blocks may map to a common cache index, a problem referred to as thrashing may occur. Thrashing occurs when two processes or instructions executing on the central processing unit repeatedly access blocks that map to the same cache index. Each time one instruction requests a block of data and it is not located at the associated cache index a miss occurs and the requested block of data is retrieved from memory. Thus, the cache may thrash between two different blocks of data at a given cache index, incurring the full memory latency each time the given cache index is accessed. When excessive thrashing occurs, the advantages of having a cache are eliminated.

A set associative architecture helps to minimize the amount of thrashing that occurs in the cache by providing more than one cache location for each cache index. In a set associative cache, the cache is apportioned into a number of sets of data blocks, and a cache index may map to an entry in any one of the sets of data blocks of the cache. Set associative caches can therefore reduce the amount of thrashing by allowing different instructions that map to the same cache index to be mapped to different sets within the cache. Although set-associative architectures help to alleviate thrashing by providing more than one cache location for each cache index, thrashing may still occur when more data blocks that map to the same cache index are in use than there are sets available in the cache.

When thrashing occurs consistently in an executing process, the overall performance of the system may be reduced to below that of a system without a cache memory. Therefore, it is desirable to provide a method and apparatus that would minimize thrashing in cache memory to allow the potential performance of the computer system to be realized.

SUMMARY

A method and apparatus for dynamically updating virtual to physical address mappings in order to reduce cache thrashing is disclosed in an example computer system having a memory apportioned into a number of pages. A cache is included in the computer system to store a subset of the pages of memory. Each of the pages of memory is addressed by a physical address that substantially includes a cache page address portion. The pages of cache memory are accessed using a cache page address, which corresponds to the cache page address portion of the physical address of a corresponding page of memory. The disclosed system monitors the activity of virtual addresses and uses the activity of virtual addresses to increment cache page address activity counters. The cache page address activity counters are monitored to identify those cache page addresses that are frequently being accessed within a process to identify potential performance problems, such as thrashing. When a cache page address activity count has exceeded a pre-determined threshold, a virtual address associated with that cache page address is mapped to a different physical address having a different cache page address. The new cache page address that is selected for remapping purposes is selected to maintain an even distribution of cache page addresses on a system and process level. The physical page formerly mapped to the virtual address that was associated with a highly active cache page address is returned to a free list of the system, for use by another process. With such an arrangement, adjustments may be made to the virtual to physical translations during execution of a given process in order to improve the overall performance of the process and the overall system.

BRIEF DESCRIPTION OF THE DRAWINGS

FIG. 15 is a block diagram of another embodiment of a memory controller for use in the computer system of FIGS. 1 or 7 for monitoring the activity of pages and performing virtual to physical remapping when a cache page address is incurring excess activity.

DESCRIPTION OF ILLUSTRATIVE EMBODIMENTS

Figure 1:
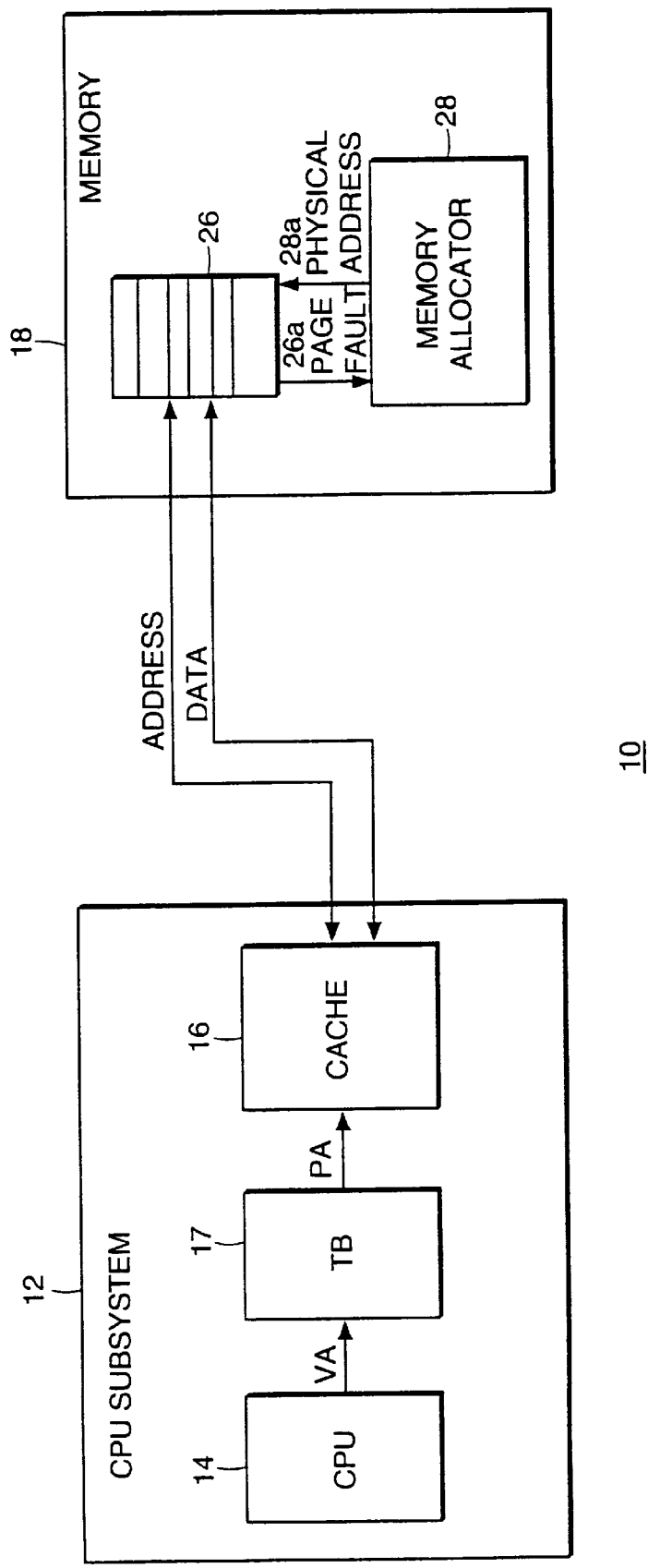
FIG. 1 is a block diagram of a computer system using a cache memory management process employing an example embodiment of the disclosed system.

Referring now to FIG. 1, a computer system 10 is shown to include a central processing unit (CPU) subsystem 12 coupled to a memory 18. The memory 18 may be a dynamic random access memory (DRAM) storage device that stores instructions and data for execution by the central processing unit. The memory may receive the instructions and data from a coupled disk or tape storage device or other source (not shown).

The CPU subsystem 12 includes a central processing unit (CPU) 14, an intermediate level cache 16 and a translation buffer 17. The central processing unit may be, for example, an Alpha™ 21264 central processing unit chip manufactured by Digital™ Equipment Corporation of Maynard, Mass.

The number of storage locations available in memory 18 and any coupled storage devices represents the physical address space of the computer system 10. According to one embodiment of the disclosed system, the CPU subsystem 12 operates in a virtual address space that is much larger than the available physical address space of the computer system 10. For example, in one embodiment of the invention, the virtual address (VA) may comprise 43 bits, capable of accessing 4 terabytes of information, while the physical address may only comprise 32 bits, capable of accessing 4096 megabytes of information. When a process is first introduced to the system, the virtual addresses of the process are mapped to physical addresses of memory 18.

The translation buffer 17 in the CPU subsystem 12 is used for translating virtual addresses generated by the CPU 14 into physical addresses for accessing the cache device 16. Each entry of the translation buffer 17 includes a page table entry (PTE) storing translation, ownership and validity information for the corresponding page of memory. Each time that a physical page of data corresponding to a virtual address is transferred into the cache 16, a page table entry corresponding to that page is copied to the translation buffer 17. Accordingly, when the virtual address next accesses that page of physical memory, the translation information stored in the translation buffer may be used to access the page of memory in the cache 16. The translation buffer 17 thus stores only those PTEs of data that are currently stored in the cache 16.

According to one embodiment of the disclosed system, the cache 16 is a 4 Megabyte direct-mapped cache. The cache 16 provides temporary storage of pages from memory 18, where each page of memory comprises 8 Kilobytes of information. Accordingly, the cache 16 is capable of storing 512 pages of memory information. Each page of memory is further apportioned into 256 sixty-four byte blocks. Information is retrieved from memory at a page size granularity using the full physical page address, while information is retrieved from the cache on a block size granularity using only a portion of the physical address, referred to as the cache index. It should be noted that the page sizes and cache sizes described above are a matter of design choice and not limitations of the present invention. In addition, the present invention should not be limited to the use of a direct-mapped cache, and other types of cache architectures, such as set-associative caches, may also be used.

The memory 18 in FIG. 1 is shown to include a page table 26 and a memory allocator 28, where page table 26 is a data structure maintained by operating system software and where the memory allocator is a software routine invoked by the operating system. The page table 26 potentially stores page table entries (PTEs) for each virtual address in the computer system 10. If a physical address has been allocated to the virtual address, it is stored in the PTE corresponding to that virtual address. The memory allocator maps physical page addresses to virtual page addresses whenever a new translation is required.

For example, during operation it may occur that the virtual address generated by the CPU does not have a valid entry in the translation buffer 17, thus indicating either that the associated physical page is not located in the cache 16 or that the translation provided by the PTE is no longer valid. In such an event, the translation buffer asserts a signal TB MISS (not shown) to the CPU 14, and memory 18 is accessed to retrieve a page table entry of the virtual address that missed in the translation buffer. As described above, the page table entry may or may not include a valid translation to a physical address. If there is a valid page table entry in the page table 26, the page table entry is forwarded back to the translation buffer, and the CPU may then use the physical address from the page table entry to initiate a second request to the memory 18 to obtain the desired data.

If there is no valid page table entry in the page table 26, then the CPU 14 issues a page fault signal, causing a software page fault handler to be initiated. The page fault handler contacts the memory allocator 28. The memory allocator allocates a free page of physical memory to map the virtual address and forwards the page address to the page table 26 for updating the page table entry corresponding to the virtual address. Once the page table entry has been updated, it may be forwarded to the CPU to allow it to use the physical address to perform a memory access to retrieve the desired data.

Figure 2A:
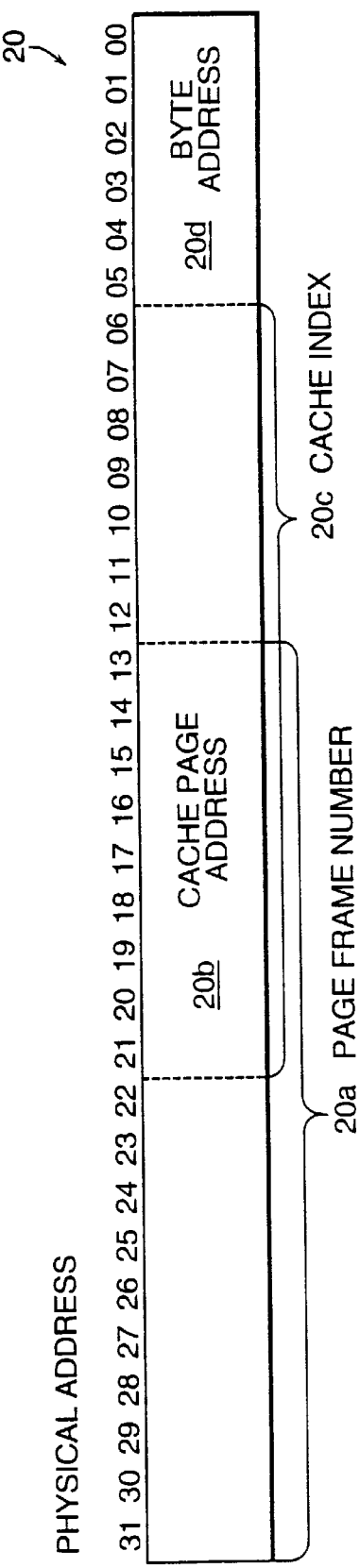
FIGS. 2A–2B are diagrams illustrating the allocation of address bits for the physical address and page table entry of the computer system of FIG. 1.

According to one aspect of the invention, the memory allocator 28 maps physical addresses to virtual addresses such that an even distribution of cache page addresses is maintained on a system wide and process wide basis. This is achieved by ensuring that the physical addresses that map to virtual addresses are allocated such that the cache page address portions of the physical addresses are distributed throughout the virtual address space. For example, referring now to FIG. 2A, an example format of a physical address of memory is shown. The physical address includes a page frame number portion 20a. The page frame number portion 20a provides a page address for one of the pages in physical memory. Included in the page frame number portion 20a is a cache page portion 20b. The cache page address portion 20b is the portion of the physical page address that identifies the cache page address of the physical page; i.e., the page location in the cache where the corresponding physical page will be stored. The cache page address portion includes the lower n bits of the page frame number, where $n=\log_2$ of the cache size. As mentioned above, the cache 16 is capable of storing 512 pages of memory. Accordingly, 2K physical pages of memory map to each of the 512 cache page addresses. The memory allocator 28 (FIG. 1), by maintaining an even distribution of cache page addresses for virtual to physical mappings on a process and system wide basis, allows the number of physical pages within a process and within the system that map to the same cache page to be minimized. By minimizing the number of physical pages that map to the same cache page address, the probability of inter-process and intra-process thrashing at a common cache page address is reduced and the overall performance of the computer system 10 is improved.

The physical address 20 also includes a cache index portion 20c. The cache index portion 20c is used to access a block of data within the cache, where, the size of the block of data is 64 bytes. The cache index portion includes the cache page address portion 20b. The physical address 20 also includes a byte address portion 20d, for selecting one of the 64 bytes of each of the blocks of cache memory.

Although the embodiment is described as using a 512 page cache, it should be appreciated that a cache having greater or fewer pages could be used with data blocks of different sizes, with the address bits comprising the cache page address portion 20b, the cache index address portion 20c and the byte address portion 20d being adjusted accordingly.

Figure 2B:
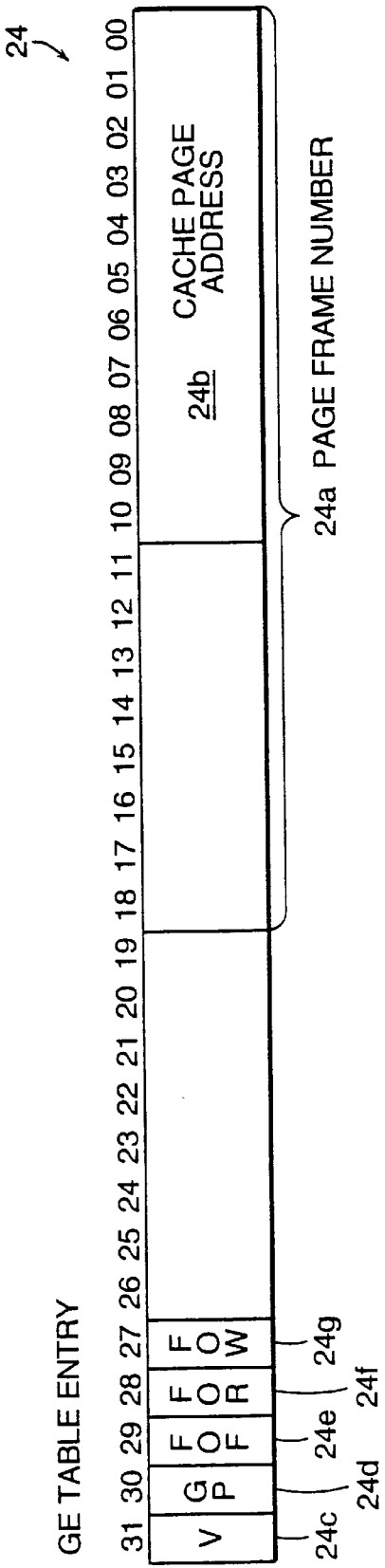

In FIG. 2B, an example format of a page table entry 24 for storage in the translation buffer 17 of FIG. 1 is shown including a page frame number portion 24a, a valid bit 24c, a global private (G/P) bit 24d, a Fault On Execute (FOE) bit 24e, a Fault On Read (FOR) bit 24f, and a Fault On Write (FOW) bit 25g. As stated above, one page table entry is provided for each virtual address in the computer system 10. The page frame number 24a includes a cache page address portion 24b for identifying the cache page referenced by the associated virtual address. The valid bit 24c indicates whether the associated physical page frame number 24c is valid; i.e., whether there is a valid translation that exists for the virtual address to a physical address. The global/private bit 24d is used for identifying whether the associated virtual address is resident in a global or private portion of the virtual memory assigned to an associated process. The FOE, FOR and FOW bits are used for initiating a fault condition when the associated virtual address is accessed for an execute, read or write operation, respectively. The use of the G/P bit and the FOE, FOR and FOW bits is described in more detail later herein. The page table entry may also include other bits (not shown) such as ownership bits, indicating which processes have a right to access the physical page; a modify bit, indicating the modifiability of the page; as well as other information deemed pertinent to translation. The PTE may include any subset of the above control bits in addition to the page frame number and thus the invention is not limited to the use of a page table entry as illustrated in FIG. 2B.

Figure 3:
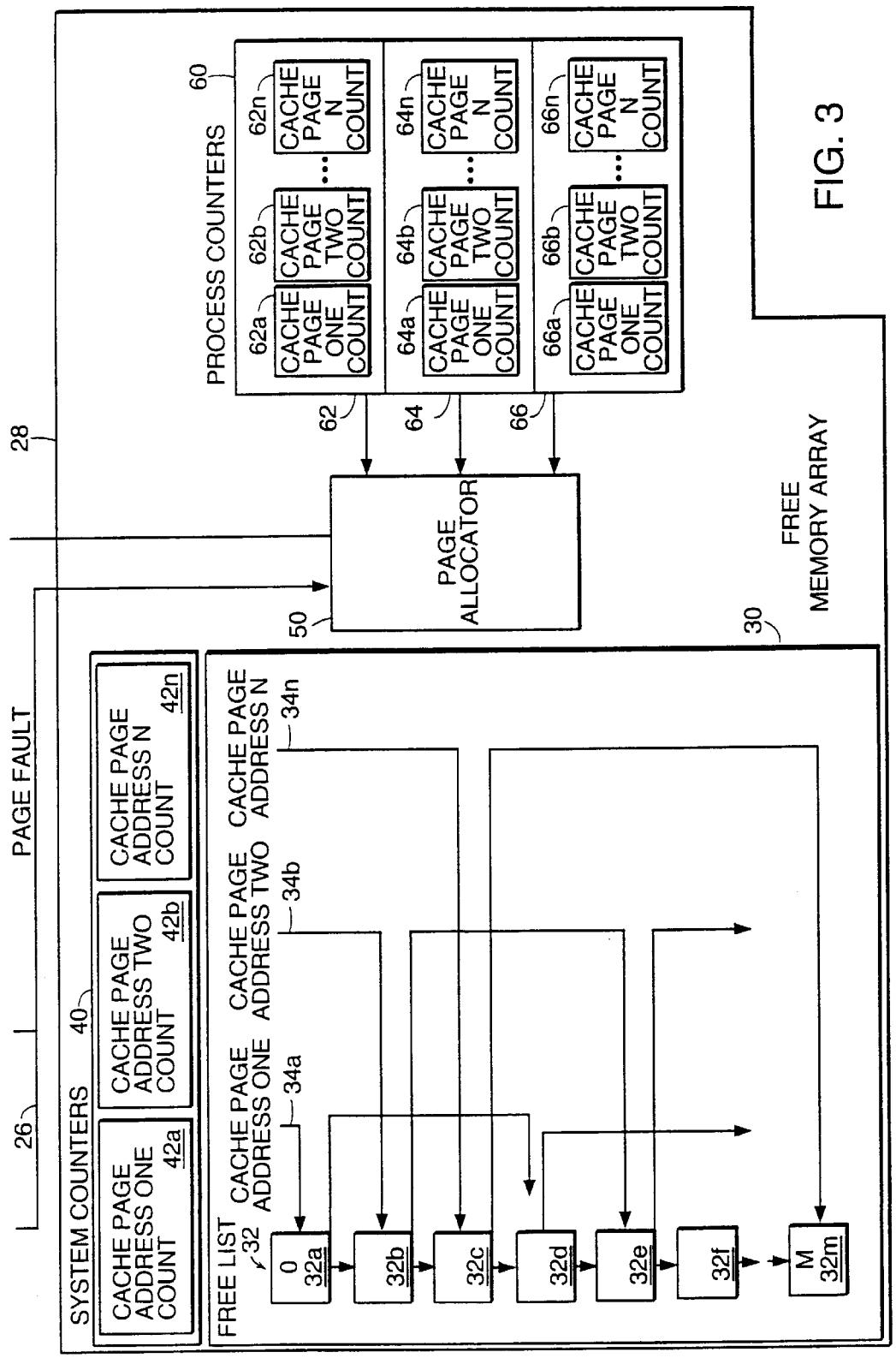
FIG. 3 is a block diagram illustrating the functional blocks and data structures of the memory management software of the computer system of FIG. 1 according to one embodiment of the invention.

Because the memory allocator 28 (FIG. 1) controls the mapping of physical addresses to virtual address by updating the PTE for each virtual address requiring translation, it has control over how the physical addresses are distributed within the virtual address space. Referring now to FIG. 3, one embodiment of a memory allocator 28 that may be used to evenly distribute cache page addresses among virtual addresses on a system and process wide level is shown. The memory allocator 28 includes a number of data structures including free memory array 30, system counters 40 and process counters 60. A page allocator software routine 50 is coupled to read data from each of the data structures 30, 40 and 60.

The free memory array 30 includes a free list 32, which is a linked list data structure having one entry corresponding to each free page in physical memory. When the operating system is first initialized, the free list includes every page of physical memory. During operation, as physical pages are assigned to virtual addresses and other dedicated addresses, the assigned physical pages are removed from the free list 32 and the appropriate linked list pointers are updated. In the example of FIG. 3, there are 'm' pages of physical memory available in memory 18.

Also included in the free memory array 30 are a series of linked lists 34a–34n. Each of the linked lists 34a–34n includes a number of pointers, where each pointer points to only pages having a common cache page address. Thus, in FIG. 3, the linked list 34a points first to element 32a on the free list, then to element 32d on the free list and so on, where each of the elements are physical pages having the same cache page address. Thus, the free memory array 30 is a multi-dimensional array implemented using linked lists, with one dimension identifying the total free pages in memory and other dimensions identifying pages that map to similar cache page addresses. Although a linked list implementation has been shown, the present invention is not limited to such an arrangement and other structures including discrete arrays associated with cache page addresses may alternatively be used.

As stated above, the memory allocator 28 additionally includes system counters 40. The system counters 40 include a series of counters 42a–42n, with each counter identifying a total number of pages currently included in a corresponding one of the linked lists 34a to 34n. Thus, cache page address one counter 42a corresponds to the number of free pages that are pointed to by linked list 34a, and accordingly indicates the number of free pages having cache page address one that are available for mapping to virtual addresses by the memory allocator.

One embodiment of memory allocator 28 additionally includes a number of process counters 60. The process counters include, for each process P0, P1 . . . PX, a number of counters, with each counter for each process corresponding to one of the pages in the cache. The contents of each counter indicate how many pages having the respective cache page address are in use by the process. Accordingly, process P0 62 includes a cache page address one counter 62a, a cache page address two counter 62b, a cache page address three counter 62c, and other counters up and to including a cache page address n counter 62n, where n corresponds to the number of unique page addresses in the cache 16, and in the above described embodiment is equal to 512.

The system counters 40 and the process counters 60 are used by the page allocator 50 when the page allocator receives a request for a physical address to map to a virtual address. When a page fault is received, the page allocator selects one of the available cache page addresses as a basis for selecting a physical address to map to a virtual address responsive to the values of the cache page address counters of the process being executed and further in response to the values of system counters 40.

Figure 4:
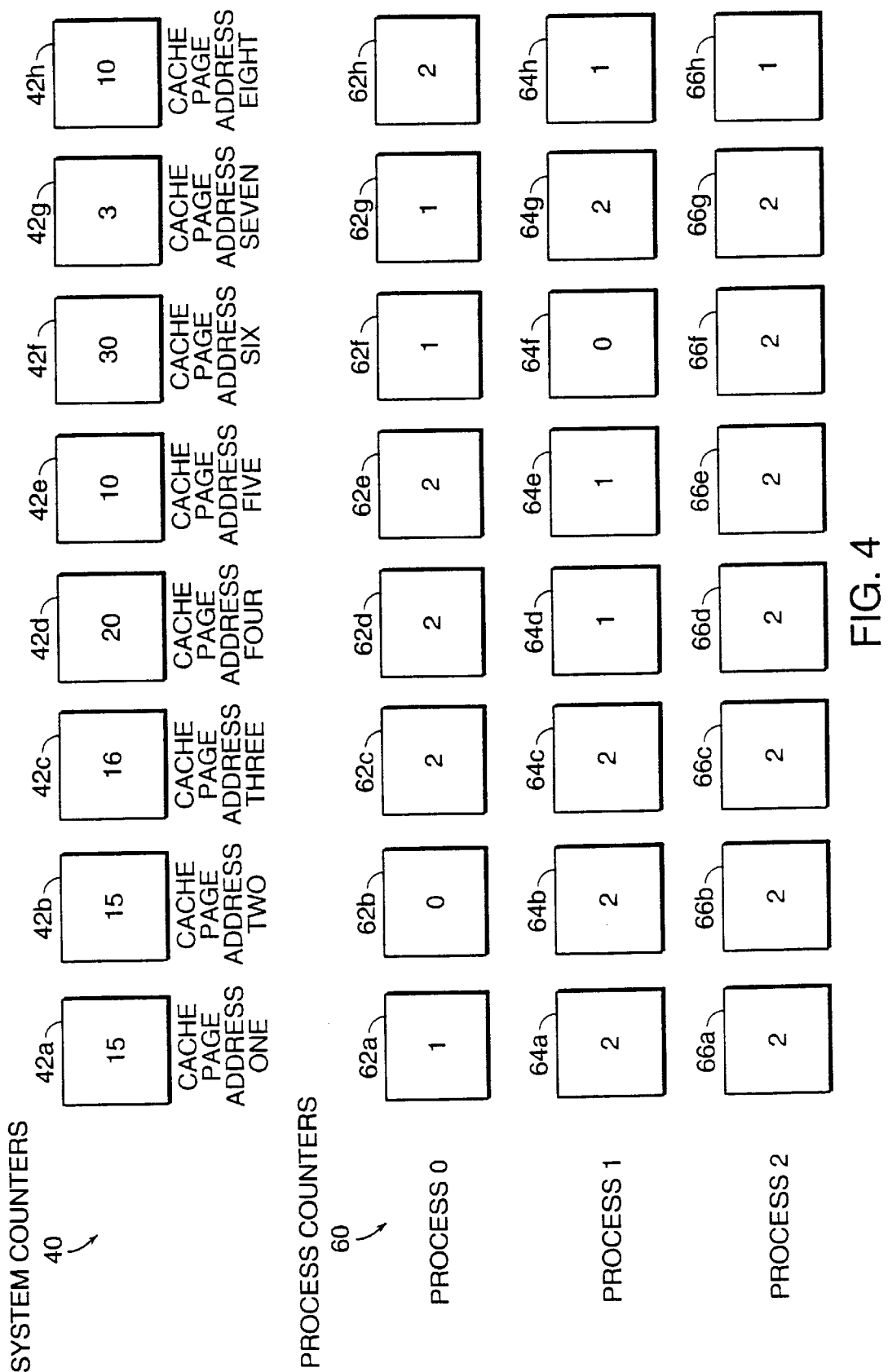
FIG. 4 is a block diagram used for describing the use of counter values by the memory management software of FIG. 3.

For example, referring now to FIG. 4, a group of eight system counters 42a–42h have been shown, including their respective counts, where each of the counts indicates the number of free pages having the associated cache page address that are currently available for mapping to a virtual address. For example, cache page one count, maintained by counter 42a, indicates that there are 15 free pages of free physical memory having a cache page address of one. Cache page seven count, maintained by counter 42g, indicates that there are only three free pages in physical free memory having a cache page address of seven. Cache page six count, maintained by counter 42f, indicates that there are 30 free pages in physical free memory having a cache page address equal to six. On a system wide basis, when selecting a physical address for assignment to a virtual address, in order to evenly distribute cache pages on a system wide level the optimal cache page to select is the cache page associated with the counter indicating the highest number of free pages. Therefore, in the example of FIG. 4, the most preferable system wide cache page address is cache page address six which has 30 free pages.

In contrast, the process counters illustrate how many pages having the associated cache page address have already been allocated to that process. In FIG. 4, three sets of process counters, associated with process0, process1 and process2, respectively, are shown. In a process where the number of pages used by the process is exactly equal to the number of pages in the cache, preferably each of the counts 62a to 62h would equal one, thereby ensuring that no two pages of the same process are mapped to the same cache page and consequently eliminating the possibility of intra-process thrashing. However, frequently the working set of the process is much larger than the number of pages available in the cache. Therefore, it may occur that the counts for each of the cache page addresses exceeds one. Thus, from a process viewpoint, it is preferable to ensure that the cache page address selected for assignment is that cache page having the lowest corresponding process page count. In the example of FIG. 4, cache page address two, indicated by counter 62b, is the preferable page to select for providing a physical address for physical to virtual address mapping for process0 because there are zero pages of cache page address two currently in use by the process0.

It may occur that there is a conflict between the cache page address that is the most optimal to provide from a system-wide viewpoint and the cache page address that is the most optimal to provide from a process viewpoint. As shown in FIG. 4, the optimum physical page for assignment on a system-wide basis is one having a cache page address of six, while the optimal physical page for assignment on a process-wide basis for process0 is one having a cache page address of two. According to one embodiment of the disclosed system, the selection of a cache page address on a process-wide basis has precedence over the selection of a cache page address on a system-wide basis in order to ensure that thrashing within a process is minimized. Of course, it is envisioned that preference may alternatively be given to the system selection. In addition, it is further envisioned that the selection criteria may be switched between giving preference to the system or to the process, in accordance with the type or priority of the process which seeks mapping.

Figure 5:
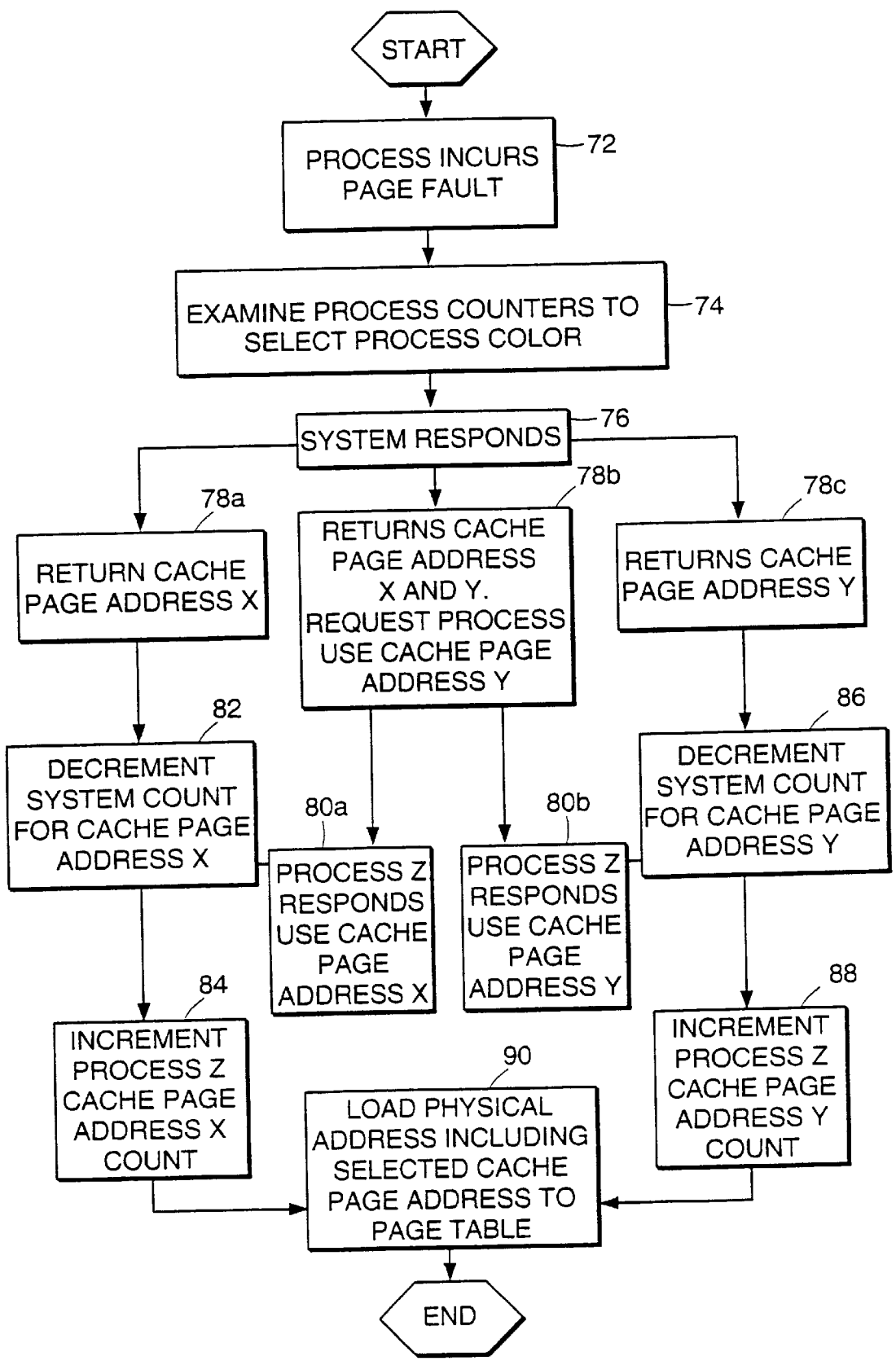
FIG. 5 is a flow diagram illustrating a process for allocating cache page addresses by the memory management software of FIG. 3 according to one embodiment of the invention.

Referring now to FIG. 5, one embodiment of a process 70 for assigning a cache page address to a virtual address of a given process is shown. At step 72, a given process, hereinafter referred to as "process Z," incurs a page fault when attempting to translate a virtual address to a physical address. For example, this may occur when process Z is first created and the initial physical addresses are mapped to the virtual addresses of the process. After process Z incurs a page fault, at step 74, the page allocator 50 checks the process pointers 60 to determine which cache page address is preferable for that process. For purposes of example, assume that process Z selects cache page X as the preferable cache page. At step 76, once the process cache page is selected, the page allocator checks the system counters to determine the best cache page address for mapping to the virtual address on a system wide basis. The examination of the system counters may produce three different alternatives, designated in the flow diagram as steps 78a, 78b and 78c. The page allocator may return a page having cache page address X such as shown at steps 78a. If a page having a cache page address X is selected at step 78a, at step 82 the system count for cache page X address is decremented, and at step 84 the process count of process Z for cache page X address is incremented.

Alternatively, the system may indicate at step 78b that it has an available page of cache page X, but a page of cache page Y would be the preferable page to use for distributing cache page addresses on a system wide basis. The page allocator may then perform either step 80a or step 80b, depending upon whether the process can use a page having cache page address X or cache page address Y, respectively. If the process cannot use a page having cache page address Y, for example because there are too many pages of cache page address Y already in use by the process, then at step 80a the page allocator selects a page having cache page address X and proceeds to steps 82 and 84, as described above, where the system counter for cache page address X is decremented and the process counter for cache page address X is incremented. If the process can use a page of cache page address Y, then at step 80b the page allocator selects a page having cache page address Y, and the process proceeds to steps 86 and 88, where the system counter of process Z for cache page address Y is decremented, and the process counter for cache page address Y is incremented.

If, however, the system had no pages of cache page address X, then at step 78c, the system returns only a cache page address Y to the page allocator. Even if the process already has many pages of cache page address Y, the page allocator uses this page, and proceeds to steps 86 and 88, where the system count for process Y is decremented, and the process counter of process Z for cache page Y is incremented.

Whether cache page address X or cache page address Y was selected, the page allocator proceeds to step 90 where the physical address including the selected cache page address is forwarded to the page table 26 (FIG. 3).

The page allocator may request that the process select an alternate page that would better satisfy the overall system wide cache page address distribution and still be satisfactory to the process. In those instances when there are no pages of the desired process cache page address available, then the page allocator uses the cache page address that best satisfies the system. In addition, it is envisioned that other embodiments that include methods for allowing the page allocator to repetitively request preferred process pages may alternatively be used in the present invention.

The memory allocator 28 shown in FIG. 3 thus includes data structures that allow for pages of physical memory to be selected for virtual to physical mappings such that cache page addresses are evenly distributed on a process-wide basis. With such an arrangement, it can be ensured that intra-process thrashing may be minimized and thus performance for that process can be optimized. In addition, because the cache page addresses are also evenly distributed on a system wide basis, it can be assured that inter-process thrashing is minimized, thereby increasing the overall, system-wide performance.

The above method and apparatus for maintaining an even distribution of cache pages on a system and process wide level may be further utilized in a variety of different operations. For example, the method may be extended to provide an even distribution of pages between different portions of a process, for example the local and global portions of a process. In additional, principles of the method may be extended to provide an even distribution of cache page addresses within a data structure. Also, the method may be extended to ensure that, when pages need to be reclaimed from processes as available pages for use by other processes, the reclaiming of the page is performed in such a way that an even distribution of pages is maintained both among the remaining processes and among the available pages in the system. In addition, the method and apparatus may be augmented to include logic for maintaining an even distribution of pages as processes are swapped into and out of the system. Methods and apparatus for achieving the above functions are described in further detail below.

Assignment of Addresses to the Private Region and Global Region of Virtual Memory As mentioned previously, the above techniques may be augmented to maintain an even distribution of cache pages between virtual addresses in different regions of a virtual address space assigned to a process. The even distribution is maintained by allocating a certain number of cache page addresses to each of the different regions of virtual address space such that there are dedicated cache page addresses for each of the different regions. When selecting physical addresses for allocation to virtual addresses in each of the different regions of virtual address space, steps similar to those described with regard to FIG. 5 are undertaken to ensure that the respective dedicated cache page addresses are distributed evenly within the region, within the process and on a system wide level.

Figure 6:
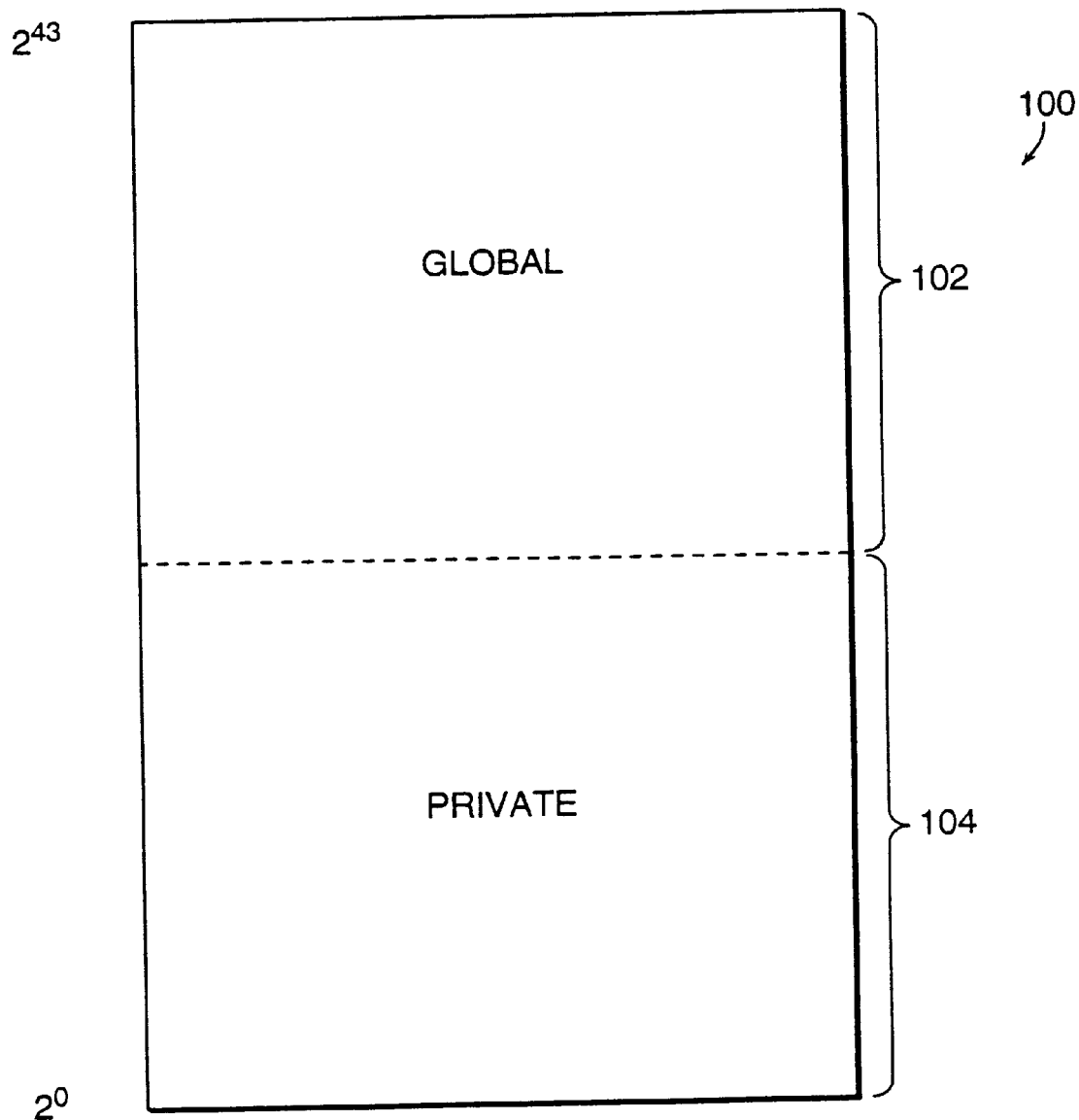
FIG. 6 is a diagram illustrating the allocation of global and private addresses in a virtual address space.

The method for evenly distributing cache page addresses in different regions of virtual memory operates generally as follows: As each process is first introduced into the computer system 10, a section of virtual memory is allocated to that process. Referring now to FIG. 6, an example of the allocation of addresses within a virtual address space for a given process X is shown. The virtual address space 100 includes a global (or shared) region 102, which may be shared by each of the processes executing in the system, and a private region 104. The global region 102 stores instructions and data that are available to any of the processes operating in the central processing unit. For example, shared libraries and start-up code may be stored in the global region 102. The private region 104 is used for providing mappings to virtual addresses that are to be used only when process X is executing.

Figure 7:
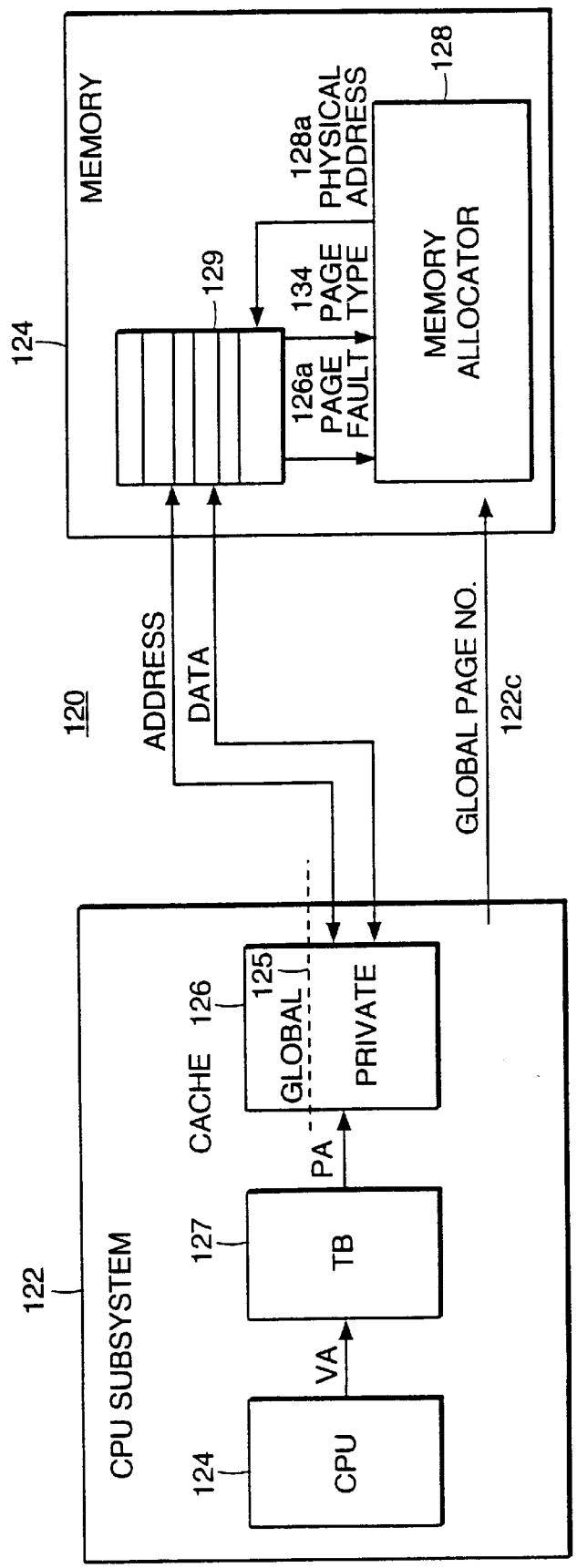
FIG. 7 is a block diagram of an example embodiment of a computer system wherein a cache of the computer system is partitioned into global and private regions.

Referring now to FIG. 7, in one embodiment of the disclosed system 120 the cache pages are partitioned into global cache pages and private cache pages. This partition is indicated by the dashed line 125 at cache 126. The physical pages having global cache page addresses are evenly distributed among global virtual addresses while the physical pages having private cache page addresses are evenly distributed among private virtual address.

By allocating different cache page addresses to global and private regions of the virtual address space, requests for data stored in the global region will not compete with requests for data stored in the private region. Because many processes having differently allocated private regions may use the same data that is stored in a global region, separating the allocation of physical addresses ensures that none of the processes' private references will thrash with global references. Such a partition is particularly helpful because global pages, once mapped to a physical address, remain in the system for a long period of time.

When a process that has mapped physical memory to the private region 104 of virtual address space terminates, the physical pages mapped to that process are returned to the free list 32 (FIG. 3) to be allocated to other processes. In contrast, when data used by a process is mapped to the physical memory using the global region of virtual address space and the process using the data in the global region terminates, those data pages are not returned to the free list. Rather, the physical pages of data stored in global space are retained to allow subsequent processes to use the data without incurring the delays associated with fetching the data and obtaining new physical to virtual translations for the data.

Because of the different handling procedures followed with regard to private and global pages, according to one embodiment of the disclosed system different methods are used for assigning physical pages to private regions of virtual memory and to global regions of virtual memory. As mentioned above with regard to FIG. 7 the dashed line 125 indicates the partitioning of cache pages into global cache pages and private cache pages. In the embodiment of FIG. 7, the higher order cache pages are dedicated to storing data mapped to the global region of virtual memory, while the lower order cache pages are dedicated to storing data mapped to the private region of virtual memory. Other embodiments, for example where the data from the global region of virtual memory is stored in the lower order cache pages, or staggered among pages in the cache, may also be used in the present invention. In general, a predetermined number of cache pages addresses are dedicated for mapping global virtual addresses, with the remaining number of cache page addresses being reserved for mapping private virtual addresses.

The predetermined number of pages that are dedicated to mapping global virtual addresses is determined by the CPU 121 in response to the types of operations that are being performed by the CPU. For example, a CPU that executes applications to perform a large amount of file serving would allocate more pages of the cache for storing global data, while a CPU that executes process intensive applications that do not share data with other processes would tend to allocate relatively fewer pages of the cache for storing global data.

The number of cache page addresses that are to be reserved for mapping global virtual addresses is forwarded as a global page number 122c from the CPU subsystem 122 to the memory allocator 128. Although the global page number 122c is shown forwarded on its own bus in FIG. 7, it may alternatively be passed on the data lines 122b or stored as a variable in a data structure or in an addressable register, in the CPU.

As described previously, when there is not a valid translation in an entry within the page table 129, a reference to a virtual address that is translated by that entry will result in the page fault signal being asserted to indicate the event to the memory allocator 128. In addition, a page type signal 134 is forwarded from the Page Table 129 to the memory allocator to indicate what type of virtual address (global or private) requires mapping to a physical address of a page of memory. The page type signal 134 is for example determined responsive to the global/private bit 124d (FIG. 2C) of the associated page table entry of the virtual address. The memory allocator 128 selects a physical address having an optimum cache page address such that the cache pages are substantially evenly distributed on a system and process wide level and also evenly distributed within each of the global and private virtual memory regions.

For example, referring now to FIG. 8, a memory allocator 128 for distributing cache page addresses within the global and private regions of virtual memory includes a free memory array 130, system counters 140 and process counters 160, each operating substantially similarly to the memory array 30, system counters 40 and process counters 60 described with reference to FIG. 3. The system counters 140, however, are apportioned into global cache page address counters 140a and private cache page address counters 140b, as indicated by dashed line 152. The number of pages that are reserved as global cache pages is determined by the global page number and provided by CPU 121. Therefore, global counters include counters 142a . . . 142gc (where gc is equal to the global count number) and private counters include counters 142gc+1 . . . 142n. The memory allocator 128 includes a page allocator 150. The page allocator 150 is a software program that uses information from the system counters and process counters, as well as the global page number from the CPU 121 and the page type from the page table 129, to select a page of physical memory having a cache page address that minimizes thrashing in the cache computer system 120.

As mentioned above, the process of selecting a physical cache page address for assignment to a virtual address is different depending upon whether the virtual address is mapped to the global region or private region of virtual memory. When selecting a physical cache page address for mapping a page of physical memory to a virtual address in the global region of virtual memory, only the global cache page address counters 140a are examined to select the optimum physical cache page address. When selecting a physical cache page address for mapping a page of physical memory to a virtual address in the private region of virtual memory, both the private cache page address counters 140b as well as the process counters 160 are examined to select the optimum physical cache page address.

Figure 8:
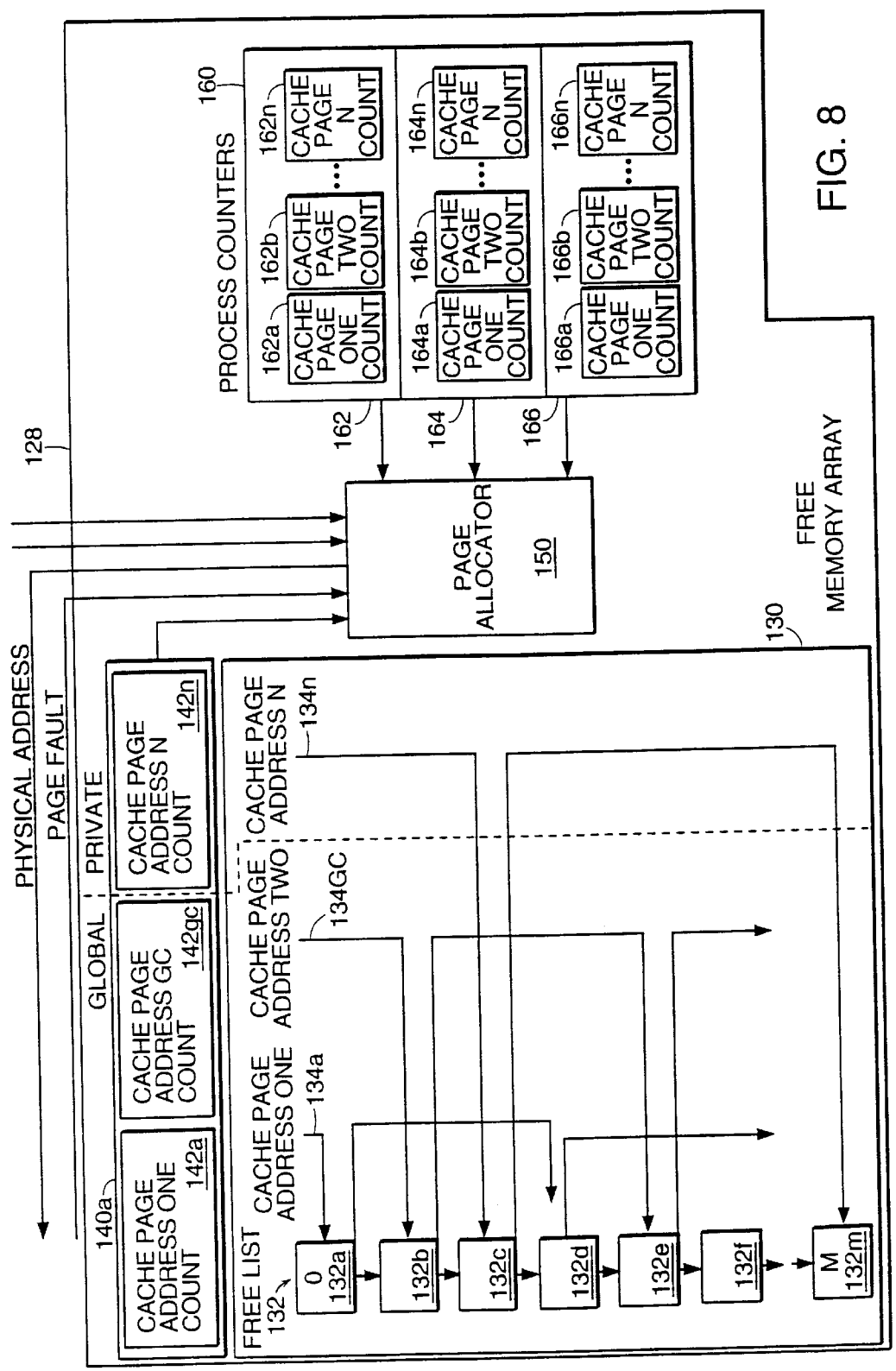
FIG. 8 is a block diagram of an example embodiment of a memory allocator for allocating physical addresses to virtual addresses responsive to whether the virtual address is global or private virtual address.
Figure 9:
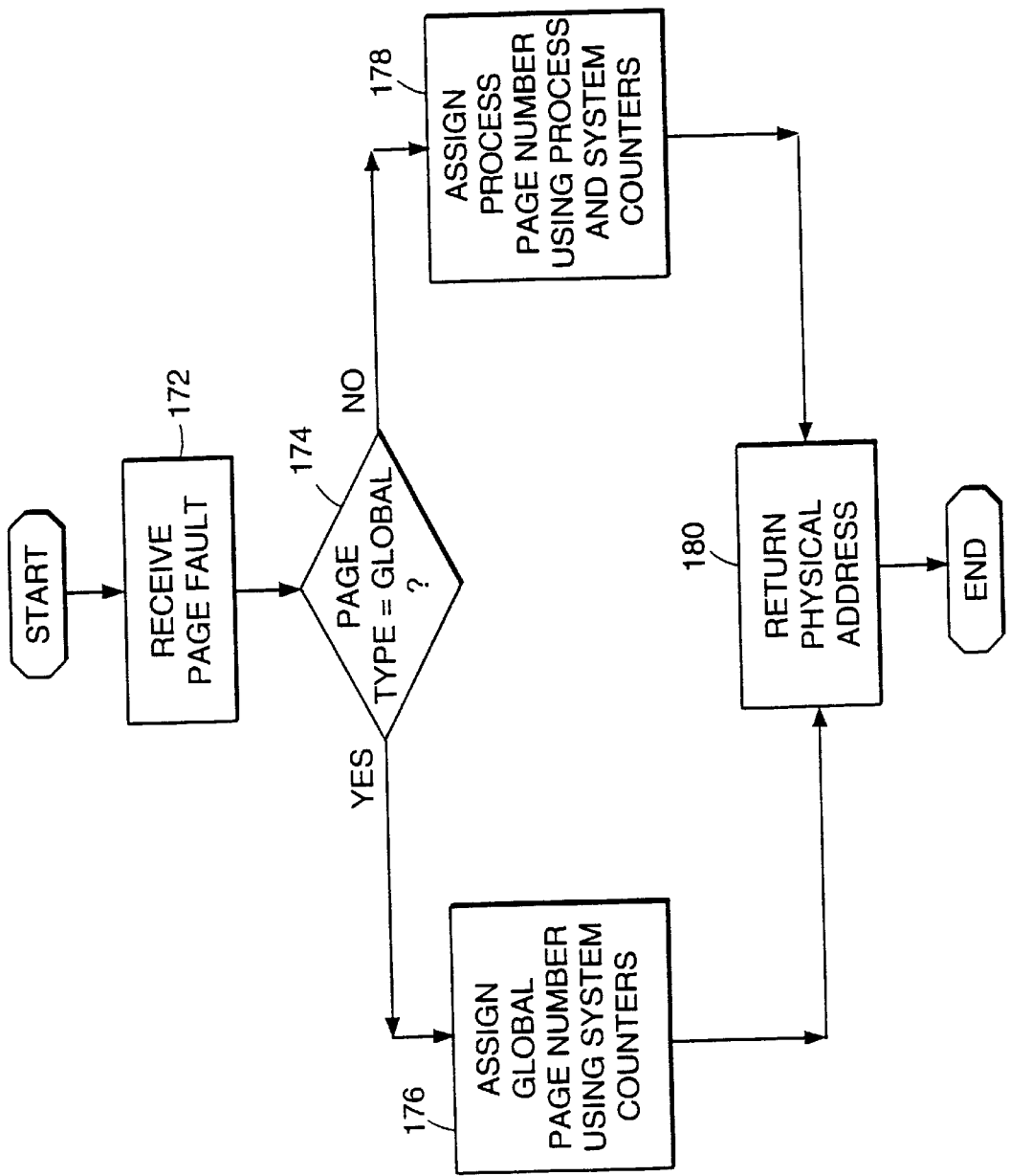
FIG. 9 is a flow diagram illustrating one embodiment of a process used by the memory allocator of FIG. 8 for assigning physical addresses to virtual addresses.

A process used for mapping physical addresses to virtual addresses in either the global or private region of virtual memory is shown in FIG. 9, and is described with reference to elements in FIG. 8. At step 172, a page fault signal is received from the page table 129, indicating that a page of physical memory is needed for mapping a virtual address. The page type of the virtual address is also forwarded to the page allocator 150, where the page type indicates whether the virtual address requiring mapping is from either the global region or private region of virtual memory. At step 174, the page allocator 150 examines the page type to determine whether the virtual address is in the global or private region of virtual memory. If the page type indicates that the virtual address is from the global region of virtual memory, then at step 176 the page allocator 150 examines the global cache page address counters 140a to select the cache page address associated with the counter having the highest number of pages. Note that no reference is made to the process counters 160 or the private cache page address counters 140b, and thus the mappings for virtual addresses in the global region on of virtual memory are determined solely in response to the global cache page address counters 140a.

If, however, at step 174 the page type indicates that the virtual address is from the private region of virtual memory, then at step 178 the page allocator 159 selects a physical cache page address using the steps previously described with regard to FIGS. 4 and 5, examining only the private cache page addresses 140b rather than all of the system counters 140. Thus, in determining the optimum cache page address to assign to the virtual address in the private region of virtual memory, the private cache page address counters 140b are examined along with the process counters 160 of the associated process to select a cache page address such that cache page addresses are evenly distributed within the current process and across all processes.

Accordingly, by segregating the cache memory into global and private regions, thrashing between global and private virtual addresses may be eliminated. A straightforward method for partitioning the cache is provided by apportioning system cache page address counters into global cache page address counters and private cache page address counters, and selecting physical page addresses for mapping using cache page addresses associated with the virtual memory region of the virtual address to be mapped. The partitioning of the cache page addresses may be dynamically adjusted as the system requirements fluctuate and greater or fewer cache page addresses are needed to map the global region of virtual memory.

Although the above method has been described with regard to global and private regions, it is envisioned that it may be extended to support distribution of cache page addresses within any number of regions of virtual memory and therefore the invention is not limited to the use of two regions.

Assignment of Physical Memory Pages to a Data Structure

According to one embodiment of the disclosed system, an improved method may be used for allocating physical memory pages to a data structure. One example of a data structure whose access rate is improved by the disclosed system and method of selecting physical memory pages based on cache page address is a Unified Buffer Cache (UBC). The UBC is a software cache that is principally used to store file system data. Data that is stored in the UBC is available to all processes that execute in the computer system. In an example embodiment, the UBC has associated with it a set of physical memory pages which are directly accessed using physical addressing, without the need for translation of virtual addresses.

A page of data in the UBC is located using a "locate handle" that includes an object identifier and an offset. The object identifier is associated with a specific file that is retrieved from the file server while the offset identifies a page within the file. Once the page is located, data within the page may be accessed using an "access handle". The "access handle" is the physical address of the page, and is used to transfer data to and from the page in order to avoid having to map the page.

Each time a file of data is retrieved from the file system, pages of physical memory are reserved for the file. Because the size of the files are typically smaller than the size of a typical hardware cache, it is advantageous to distribute the pages of the file system data at different addresses within the cache. By distributing the pages of file system data at different pages within the cache, the time consuming practice of retrieving the pages from external devices may be minimized.

As mentioned above, the UBC is capable of simultaneously storing hundreds or thousands of files of data. According to one aspect of the invention, in order to provide fast access to all file or file system data stored in the UBC the physical pages that are allocated to the UBC are selected such that the cache page address portion of the physical addresses are evenly distributed within the UBC and/or within a file within the UBC.

Figure 10:
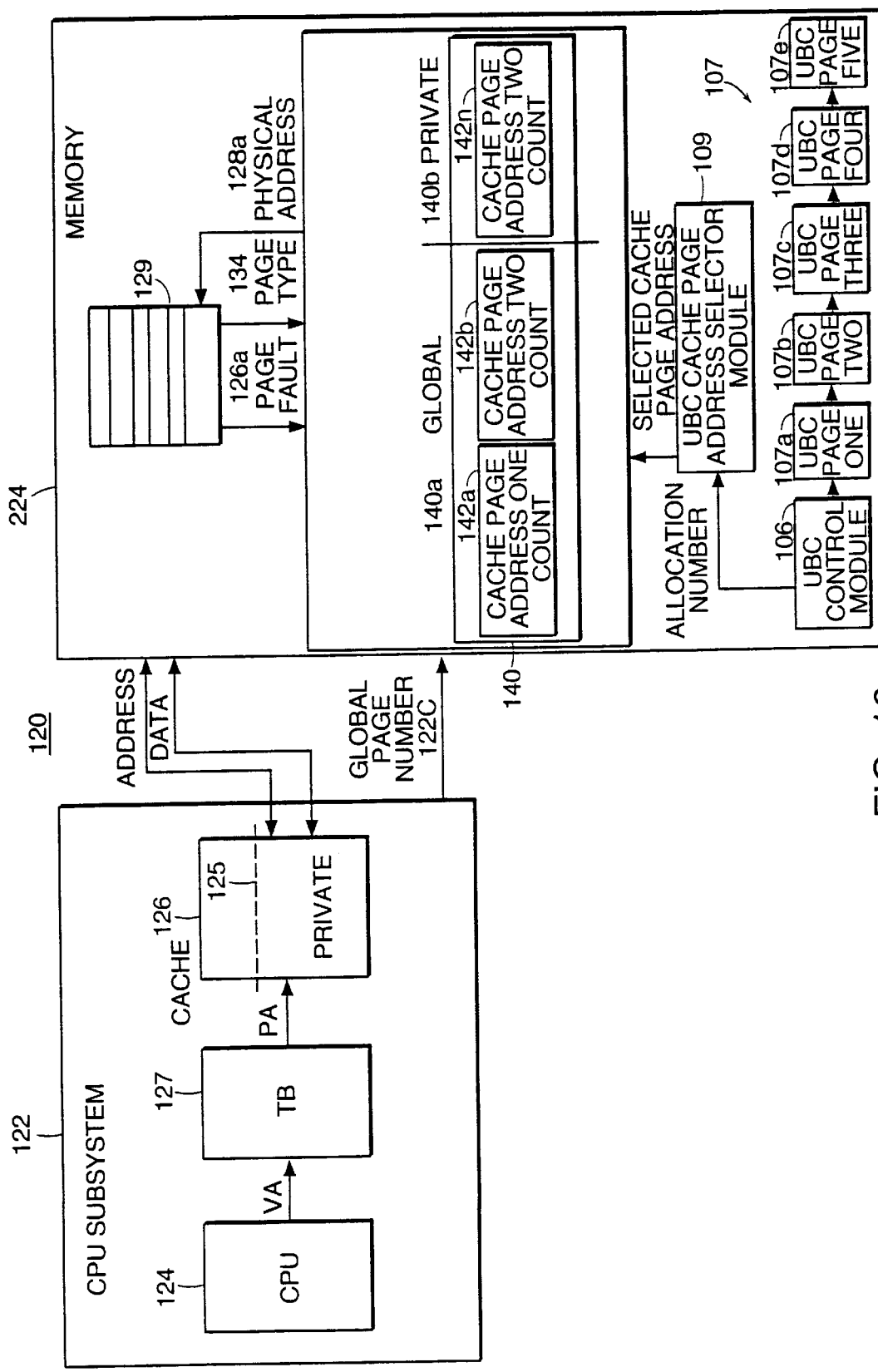
FIG. 10 is a block diagram of an example embodiment of a computer system for mapping virtual addresses of a data structure to physical addresses such that an even distribution of cache page addresses is maintained.

Referring now to FIG. 10, a block diagram of one embodiment of a memory allocator 128 for allocating physical addresses to the Unified Buffer Cache is provided. As mentioned above, the UBC is a software cache, the reading and writing of which is controlled by a UBC control module 106. According to one embodiment, the UBC includes a linked list data structure 107, with each entry 107a, 107b, 107c in the data structure storing a page of data retrieved from an external I/O device (via a file server or the like) and a pointer to the next cache page in the UBC linked list. Other data structures, such as arrays and the like may alternatively be used and thus the invention is not limited to the use of a linked list data structure.

The selection of which data pages to store in the UBC is determined in response a command that is executed in the computer system. When a process executing in the computer system executes a READ( ) or a WRITE( ) command to file system data, for example, the UBC is accessed. The Read( ) or Write( ) command includes a file identifier which is translated into an object identifier and offset for accessing a file stored in the UBC. File system data is for example data that is stored on an external Input/Output device, such as a disk or tape drive. If the READ( )/WRITE( ) command is issued for data that has already been allocated a physical page in the UBC, then the physical address of that page is available to the UBC control module 106 for accessing the page. If, however, the READ( ) or WRITE( ) command is issued for data that has not already been mapped to a physical address in the UBC, then a physical page needs to be allocated for storing the data.

Coupled to the UBC control module is a UBC cache page address selector module 109, for selecting page of physical memory to be used by the UBC. According to one embodiment of the disclosed system, the selected page of physical memory has a physical address including a cache page address that is selected by the UBC cache page address selector 109 based upon a file specific number. In one embodiment, the file specific "random" number is equal to a subset of a virtual address of an object structure associated with the file holding the data being referenced. In the example embodiment, the subset of the virtual address is selected to minimize the chances that the same number will be selected for two different file objects. Accordingly, in an example embodiment where the file specific "random" number must be 9 bits in length, and where memory is allocated on 128 byte (7 bit) boundaries, and where memory is allocated on addresses having bits 0–2 always equal to 0, then bits 3–7 of each allocated memory address are the most rapidly changing bits across any set of memory allocations. In such a scenario, the bits 3–12, a total of 9 bits including bits 3–7, would be used as the file specific "random" number portion of the virtual address of each file object. As previously mentioned, the file object structure is an internal data structure that is used by the operating system to describe each opened data file. In this way, the cache page address is thus selected based on the address of the object. As pages of the opened data file are read into the UBC, the pages are assigned an offset, relative to the address of the object structure, where the offsets need not be assigned linearly.

The cache page address is further selected based on an allocation number, where the allocation number corresponds to the relative position of the page being accessed with regard to the number of pages of the data file that have previously been stored in the UBC. For example, the third page of a data file stored into the UBC has an allocation number of three. The cache page address that is selected is thus selected without regard to the assigned offset for the page.

The UBC cache page address selector is coupled to the global cache page address counters 140a and the private cache page address counters 140b. Although the cache page address selector does not use information from the counters 140a and 140b when selecting a cache page address, it notifies the cache page address counters of the selected address in order to decrement the counters so that they are in a proper state for use in allocating physical addresses to the virtual addresses for non-UBC allocation methods. As in the embodiments of FIGS. 3 and 8, the cache page address counters are coupled to the free list 132 and cache page address lists 134a–134d in order to provide a full physical address from one of the lists using the selected cache page address.

The UBC cache page address selector 109 selects a physical address for data to be stored in the UBC such that cache page addresses are evenly distributed among physical addresses of physical memory pages in the UBC. As described above, the UBC cache page address selector selects a cache page address in response to a file specific number (R) (which in one embodiment is a subset of the address of an object data structure associated with the data file), the total number of global cache pages (GC), and the allocation number (A) of the data page relative to previously allocated pages of the data file using below Equation I:

$$\text{Cache Page Address} = (R+A) \text{ AND } (GC-1) \quad \text{Equation I}$$

Once the cache page address has been selected, the UBC cache page address selector 109 forwards the selected cache page address to the cache page address counters 140a and 140b. A physical address having the selected cache page address is retrieved from one of the corresponding cache page address lists 134a–134gc (FIG. 12) and the associated cache page address counter is decremented.

Figure 11:
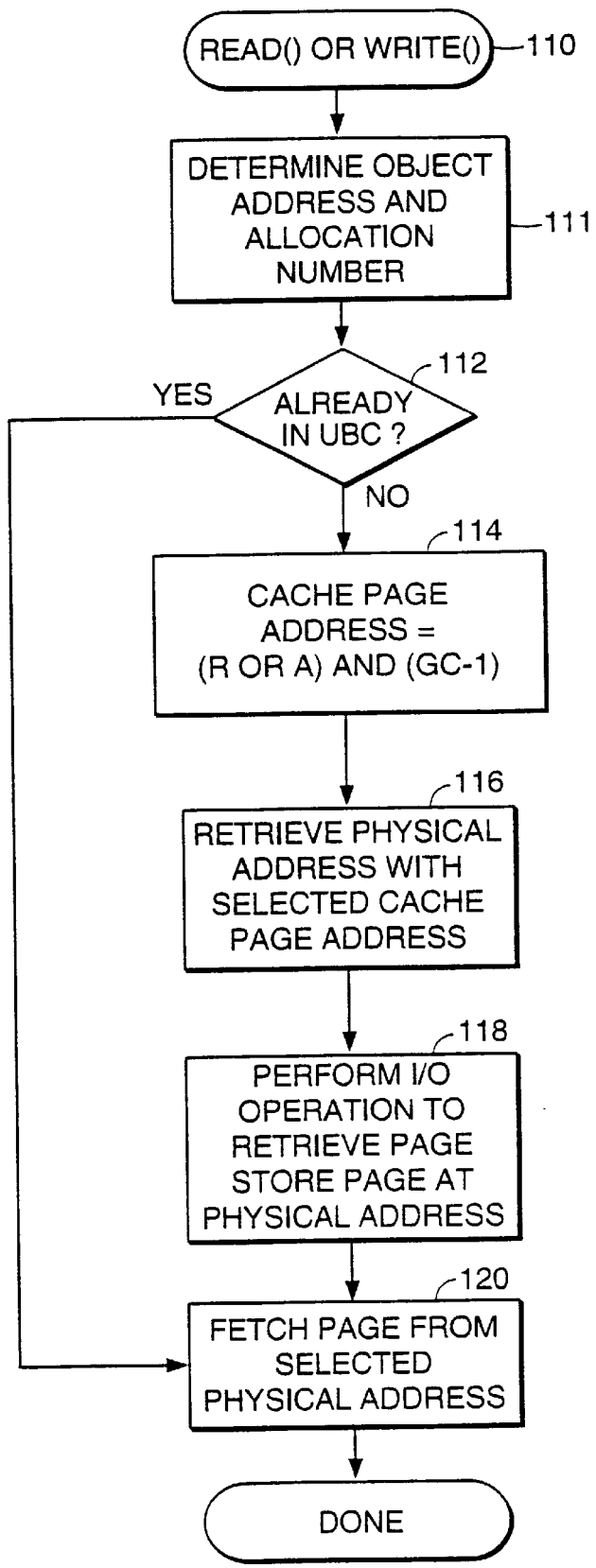
FIG. 11 is a flow diagram of allocation logic used to map virtual addresses to physical addresses in the computer system of FIG. 10.

Referring now to FIG. 11, an exemplary flow diagram illustrating the method for allocating physical pages of memory to the Universal Buffer Cache is provided. At step 110, a READ( ) or WRITE( ) of data is performed to access a page of a data file from an I/O device. At step 111, the virtual address of the object data structure for the file is determined. If this is the first time that the data file has been accessed, the object data structure address is assigned by the operating system. If it has been opened previously, the object data structure address is stored in an object identifier table (not shown) in the operating system. One or more bits of the object data structure address (i.e., those bits necessary to provide unique identifiers) are used as a file specific number (R) for the purpose of selecting a cache page address. A page offset is generated for the page, with the offset being a value representing the difference between the base address of the file or file object and the address of the accessed page. In addition, an allocation number (A) for the page of data is determined, where the allocation number corresponds to the number of pages of the data file that have previously been stored in the UBC. Note that there need not be a direct correspondence between the offset value and the allocation number.

At step 112, a comparison is made between the offset and each of the offsets of each of the pages stored in the UBC. If there is a match, then the data page is already stored in the UBC, and the process continues to step 120, where the previously allocated physical page address is used for the READ( ) or WRITE( ) reference. If there is not a match, then the process proceeds to step 114, where a cache page address is selected according to the above Equation I by the UBC cache page address selector 109. At step 116, the selected cache page address is forwarded to the global cache page address counters 140*a*, and a physical address having the selected cache page address is allocated and the associated counters and linked lists are updated. At step 118, an I/O operation is performed to retrieve the associated data page from the external device, and at step 120 and the page is copied to physical memory at the physical address allocated by the UBC.

Thus, once a physical address has been allocated to an entry in the UBC, the time consuming step of retrieving data from the external I/O device need not be repeated each time file server data is accessed. Intra-file thrashing is reduced by using the allocation number of the page to select a cache page address for the allocated physical address. Also, inter-file thrashing is minimized because the file specific "random" number that is used as the basis for determining the cache page address is generated from one or more bits of file specific object addresses.

Accordingly, a method and apparatus for selecting cache page addresses to use when allocating physical memory for entries in a data structure has been provided. Although the above method for allocating cache page addresses has been described with regard to a UBC data structure, the present invention is not limited to such a use. Rather, the above described method of selecting cache page addresses may be used for any data structure that has entries that are accessed by one or more processes to reduce the thrashing that may occur with regard to accessing data within that data structure.

Reclaiming Cache Page Address

Although the above methods have described a technique for selecting a cache page address for a page of physical memory to be allocated, there may occur situations where a page of physical memory must be reclaimed. As will be described below, the reclaiming of a page of physical memory is performed in order to ensure both that an even distribution of assigned cache page addresses is retained, and also to ensure that an even distribution of unassigned cache page addresses is made available in the system. Maintaining an even distribution of unassigned cache page addresses helps ensure that a variety of cache page addresses are available for subsequent assignment.

As described above, once global virtual addresses are mapped to pages of physical memory, the mappings of the physical pages may be maintained even after the initial process terminates. A problem may occur when the physical memory available for mapping to global virtual addresses is highly or fully utilized, but more global virtual addresses require mapping to physical addresses. A similar problem may occur in private virtual address space, when processes that are currently active in the system require more pages of physical memory than are available for mapping to private virtual addresses. The total need for pages measured against the total available pages in physical memory is referred to as the commitment ratio. When the total need is equal to the total available pages, the commitment ratio is one. When the need exceeds the total number of available pages, the commitment ratio is greater than one, and physical pages that were previously assigned to a process (in private space) or to global data (in global space) must be reclaimed.

When a page of physical memory is reclaimed, the data previously stored at the physical page is written to a backup storage area, such as a disk, and the physical page is free for use by other processes executing in the computer system. A problem lies in determining which physical page is the optimum physical page to reclaim in order to ensure that currently executing processes continue to execute smoothly. One method of selecting a page for reclaiming is to locate the least recently used (LRU) page of allocated physical memory. The LRU page reclamation method stores, with each page of data in physical memory, a time stamp indicating when the page of data was last accessed. When selecting the optimum page for reclamation using the LRU method, the time stamps are examined to locate the least recently used physical page. The assumption made by the LRU method is that the least recently used page is not as critical to the currently executing processes as other pages, and thus may be reclaimed. Other methods of selecting a page for reclamation may additionally examine the operating priority of processes owning the allocated pages, and reclaim pages of processes having relatively lower priorities.

According to one embodiment of the invention, the reclaiming of a page of physical memory is determined not only in response to the above selection criteria, but additionally in response to the cache page address of the pages being examined for possible reclamation. By selecting a page for reclamation based on its cache page address, it can be assured that the best page is selected for the purposes of minimizing future thrashing in the cache of the computer system.

Figure 12:
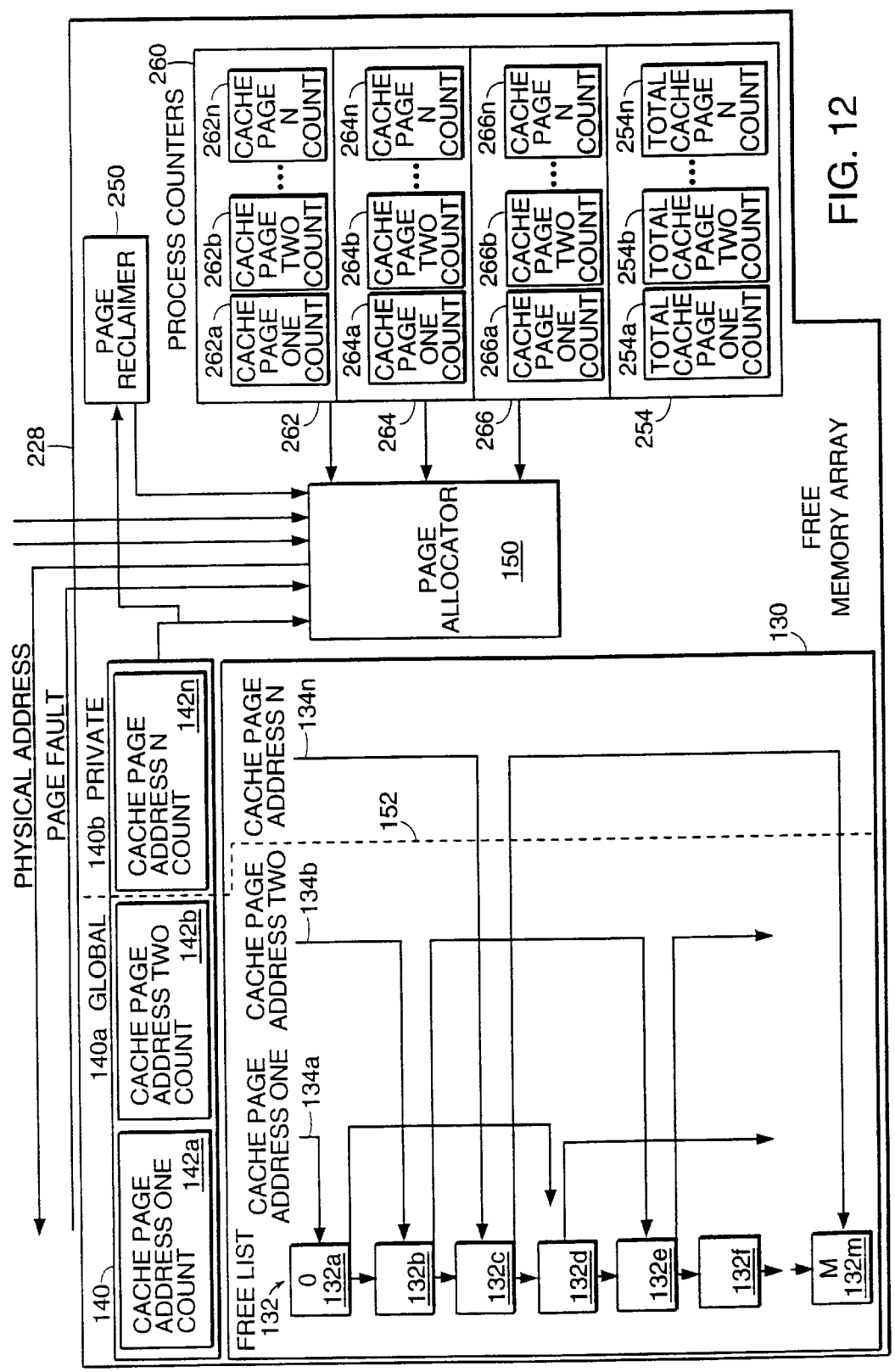
FIG. 12 is a block diagram of another embodiment of a memory allocator for use in the computer system of FIGS. 1 or 7 for reclaiming pages of physical memory.

Referring now to FIG. 12, a block diagram of one embodiment of a memory allocator 228 is shown including a page allocator 150, system counters 140, and free memory array 130 which operate as described with regard to FIGS. 3 or 8. In addition, the memory allocator 228 includes a page reclaimer 250 and process counters 260. As shown in FIG. 11, the process counters have been augmented to include, for each cache page address, a total count 254*a*–254*n* for each of the n cache page addresses available to the processes. Each total count counter is maintained to be equal to the total number of physical pages having a specific cache page address allocated across all processes. The page reclaimer 250 is a software module which controls the reclaiming of a page having a desired cache page address from the computer system using the system counters 140 and the total process counters 254 as described below.

Figure 13:
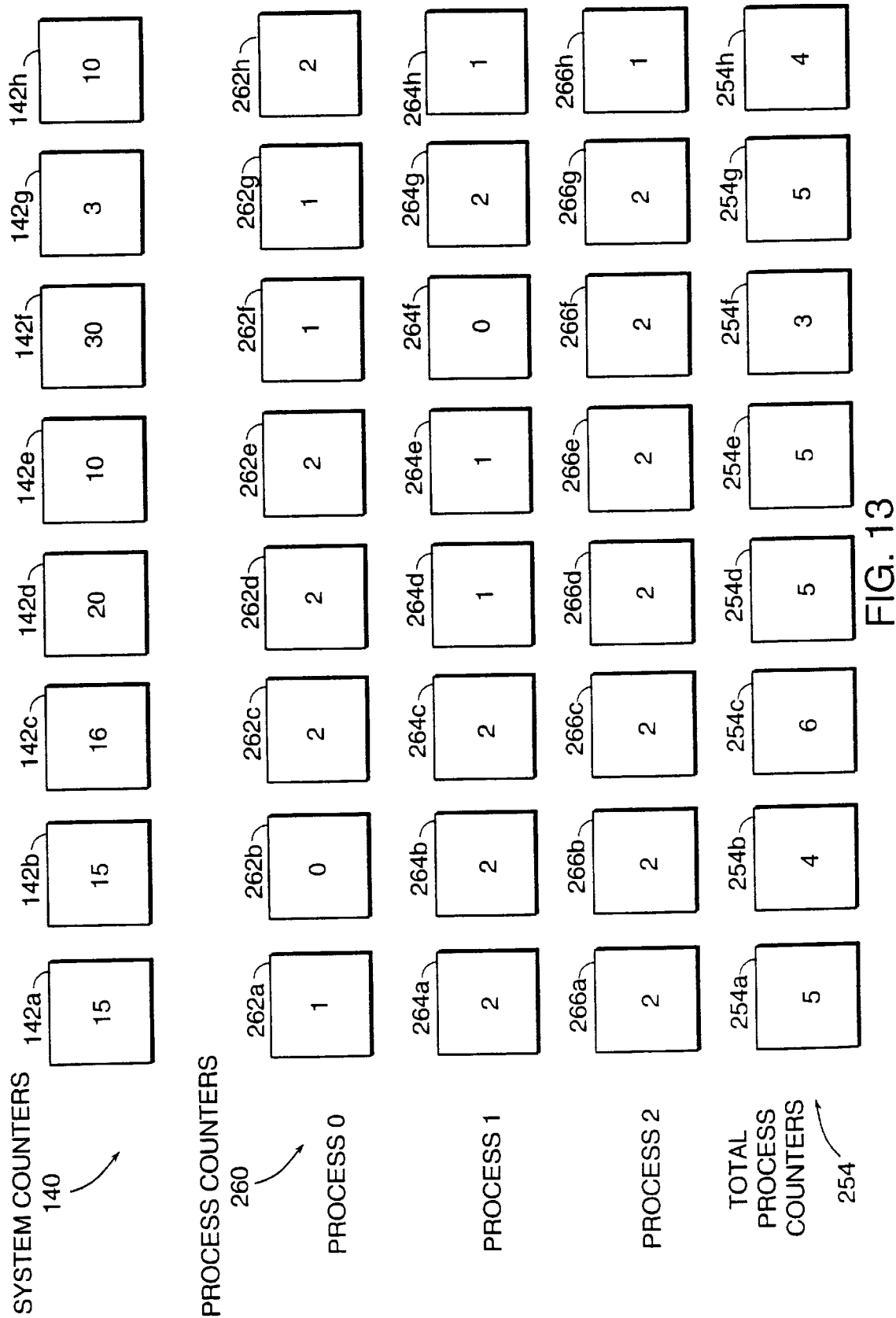
FIG. 13 is a block diagram illustrating the use of counters during the reclaiming of pages in the computer system of FIG. 12.

Referring now to FIG. 13, the system counters 140 indicate counts of free pages corresponding to specific cache page addresses. When selecting a cache page address for reclaiming a page, the optimum system cache page address to select is that cache page address associated with the fewest available pages. In the example of FIG. 12, the optimum cache page to select, on a system wide basis, is cache page address seven associated with counter 142g. Because there are only three remaining pages of cache page address seven, it is preferable to reclaim a page of cache page address seven in order to maintain the distribution of cache page addresses for later mapping to physical addresses. In addition, because more pages of cache page address seven are currently mapped in the system, the probability exists that at least one of the pages is being used for storing data that is not of use to the computer system.

When reclaiming process pages, the optimum cache page address to select is that cache page address that is mapped the most by all of the processes. Accordingly, a total count of each of the process cache page addresses is maintained in counts 254a–254n for each of the n cache page addresses available to the processes. Each time that one of the process counters is incremented or decremented, the associated total counter for that cache page address is likewise incremented or decremented. In the example of FIG. 12, the total count for cache page address three, for the illustrated processes, is equal to six. Therefore, on a process wide basis, the optimum physical pages to reclaim would be one of those allocated physical pages having a cache page address of three.

Figure 14A:
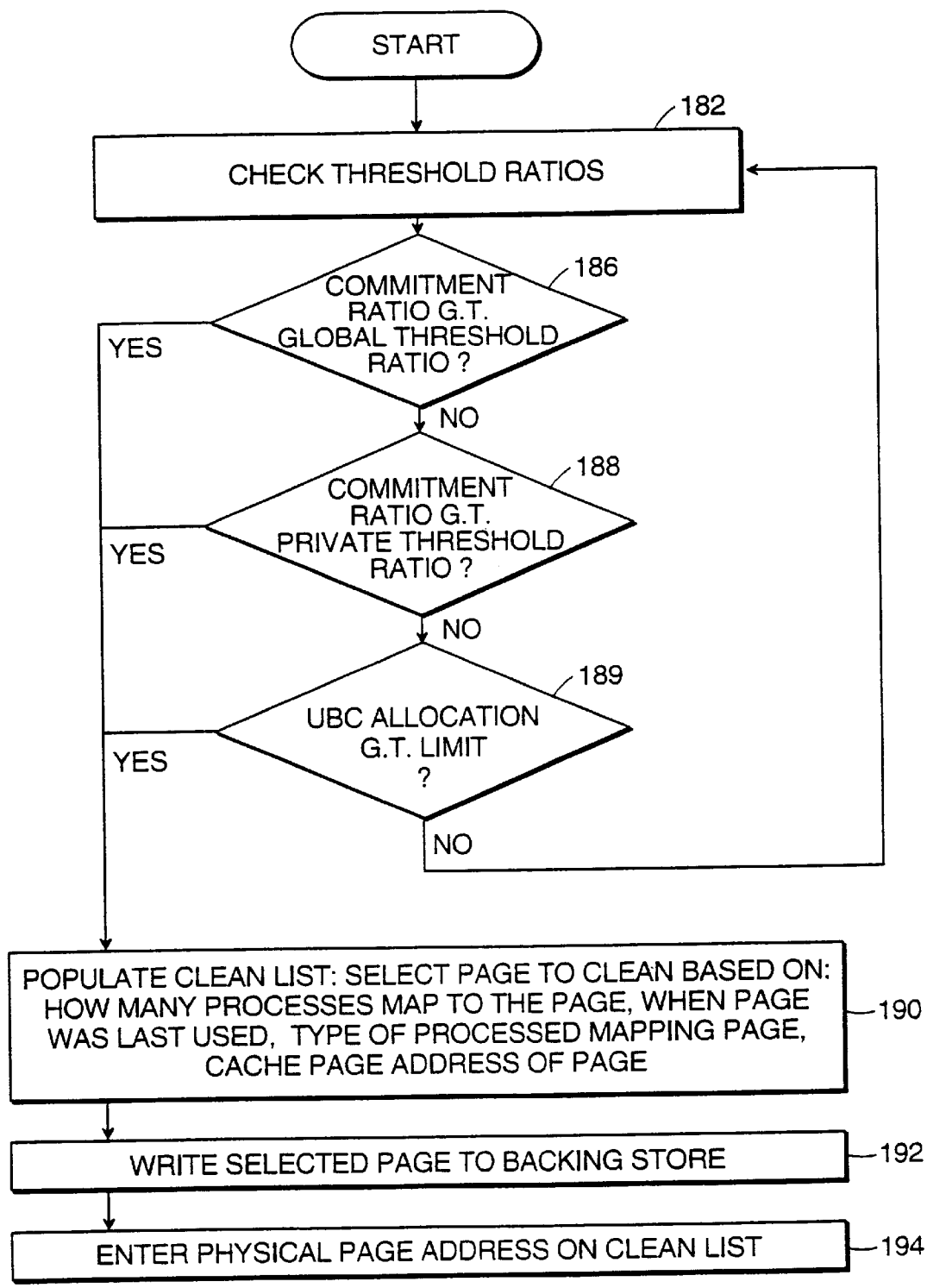
FIGS. 14A and 14B are flow diagrams illustrating one embodiment of a process used for reclaiming pages in the computer system of FIG. 12.
Figure 14B:
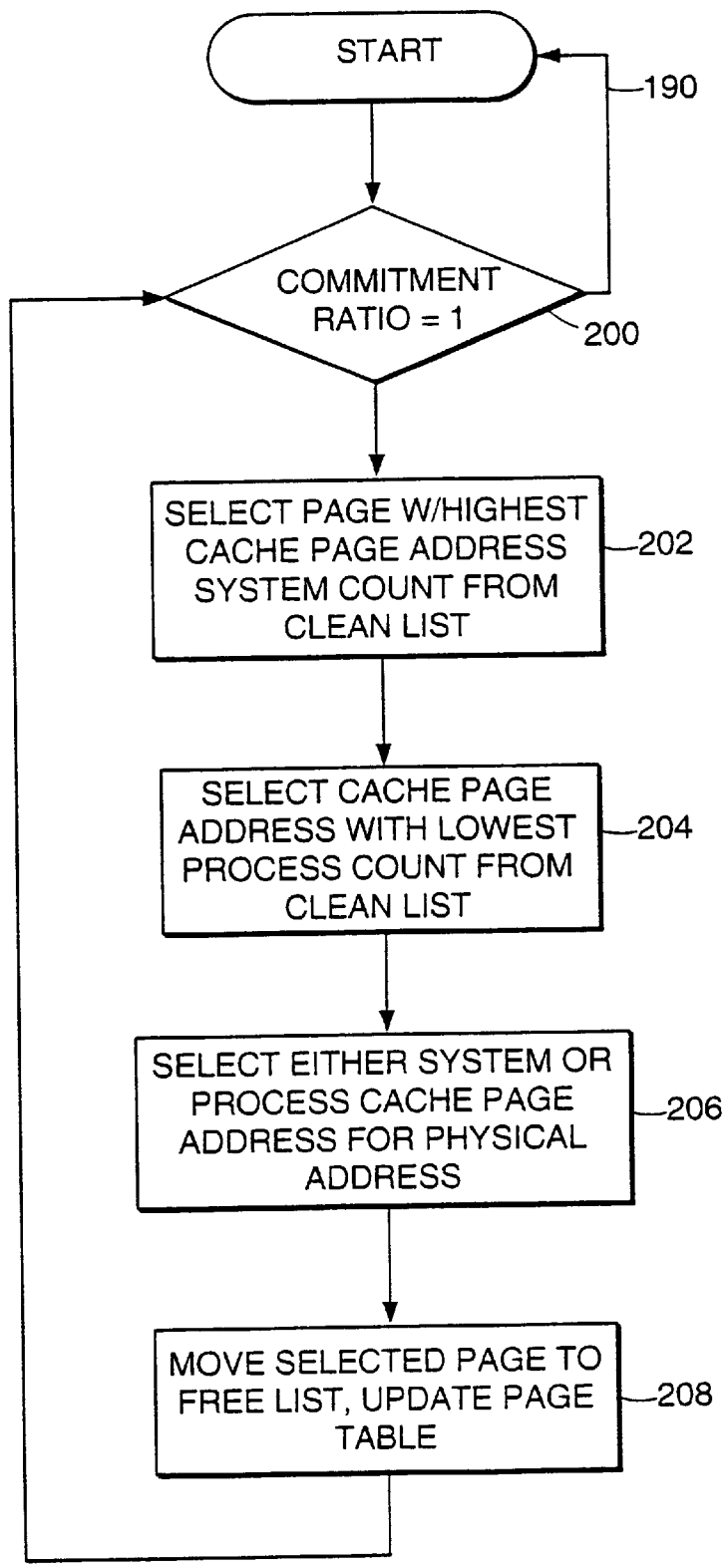

Referring now to FIGS. 14A and 14B, flow diagrams of one embodiment of a process used for reclaiming physical pages of memory is shown. In general, the process of reclaiming physical pages of memory is subdivided into two discrete processes which both execute continuously. During the first process, illustrated in FIG. 14A, a list of potential pages of physical memory that may be reclaimed is generated. Pages from the list are copied to an external storage device, such as a backing store. The list is referred to as a clean list. A page is for example selected for placement on a free list based on the following parameters: the number of processes mapping the page, the time that the page was last accessed, the type and/or priority of processes using the page and the cache page address of the page. When selecting a page as a candidate for reclaiming, the process counters 260 are examined to identify the cache page addresses that are mapped the most to private virtual addresses of all of the processes; i.e., the cache page addresses with the highest total cache page address counts. Other criteria, known to those in the art, for selecting a page of physical memory for reclaiming may also be used. By examining the cache page address of the pages that are provided on the clean list, it can be ensured that the pages that are reclaimed are selected such that there remains both an even distribution of cache page addresses in use in the system and also that there remains an even distribution of cache pages addresses in the free list.

During the second process, illustrated in FIG. 14B, one of the pages from the clean list is selected as the page to reclaim. The page from the clean list is selected in response to the system cache page address counters and process cache page address counters such that there is an even distribution of both available and in use cache page addresses on a system and process wide level. Because the pages on the clean list were copied to the backing store well in advance of when they are actually reclaimed, to perform a page reclaiming the physical address is for example simply moved from the clean list to the free list. As a result, valuable time is saved when the pages actually need to be reclaimed, and the reclaimed physical pages may quickly be provided to satisfy a pending process that awaits a translation.

Referring now to FIG. 14A, the process of generating the clean list is described in more detail. At step 182, the commitment ratio of the memory is compared against threshold ratios for private and global virtual memory. The commitment ratio is the number of allocated pages of physical memory divided by the total number of pages of physical memory. Thus, a commitment ratio of one indicates that all pages of physical memory have been allocated, for example mapped to virtual addresses. The threshold ratios indicate whether there are sufficient unmapped physical pages of cache memory for each of the respective regions of virtual memory. The threshold ratios are tunable parameters controlled by the central processing unit. The private and global virtual memory thresholds may be different or may be identical. In one embodiment, an example threshold ratio is 0.9; i.e., to accommodate subsequent allocation needs, pages should be moved to the clean list when greater than 90 percent of the pages of available physical memory have been mapped to virtual addresses.

At steps 186 and 188, the commitment ratio is compared against global and private threshold ratios. At step 189, a comparison is made of the total number of physical pages allocated to the UBC to a predetermined limit. If the decisions at steps 186,188 and 189 indicate that there are a sufficient number of unmapped pages of physical memory, the process returns to step 182, where the commitment ratio (modified by any intervening mapping transactions) is again compared against the threshold ratios. The steps of 182, 186, 188 and 189 are repeated until it is determined that the commitment ratio is greater than either global or private threshold ratios, or that the number of pages allocated to the UBC is greater than the predetermined limit. When this occurs, the process proceeds to step 190, where a new page is selected for writing to the clean list.

At step 190, the new page is selected according to the following criteria: the number of processes that map the page, the time that the page was last used, the type and/or priority of the processes that map the page and the cache page address of the page. As mentioned above, when selecting a page as a candidate for reclaiming, the process counters 260 are examined to identify the cache page addresses that are mapped the most to virtual addresses of all of the processes, i.e., the cache page addresses with the highest total cache page address counts. As mentioned above, any alternative selection criteria known to those in the art may also be used. However, using the cache page address as a selection criteria helps to ensure both that an even distribution of cache page addresses is maintained among the pages in use in the system at a process and system wide level and also that an even distribution of cache page addresses will be made available for future use.

Once a page has been selected, at step 192, data stored on the selected page is written to the backing store. As a result, a clean page is made available to the system. At step 194, the physical address of the page is written to the clean list. Any later modifications to the page result in it being removed from the clean list. The process then returns to step 182, where the commitment ratio (reflecting intervening mapping operations) is again compared to the threshold ratios.

Accordingly, as the process of FIG. 14A executes, a clean list of physical pages is provided in the system. The process of FIG. 14B uses the clean list as follows. At step 200, it is determined whether the commitment ratio of memory is equal to one, thus indicating that all of the available pages of physical memory have been mapped to virtual addresses. If the commitment ratio is equal to one, then there are no more physical pages for mapping to new virtual addresses and therefore one of the pages of physical memory is reclaimed for handling a future virtual to physical mapping request. At step 202, the clean list is examined from a system viewpoint, and the physical page on the clean list having a cache page address with the lowest relative system cache page address count is identified. At step 204, the clean list is examined from a process viewpoint, and the physical page on the clean list having a cache page address with the highest total process cache page address count is identified. At step 206, either the cache page address identified at step 202 or at step 204 is selected, based on the resolution of system and process priority concerns as described previously with regard to FIG. 5.

At step 208 the selected physical page address having the selected cache page address is moved from the clean list to the free list. Since the data from the physical page was previously copied to the backing store, no additional cycles need be used to keep memory coherent after it has reached a commitment ratio of one. In addition, the page table entry associated with the previous mapping of the selected page is invalidated so that if the virtual address that used to map to the selected physical address is again encountered, it will be remapped.

The above process has been described without consideration of whether the reclaimed page was a global page or a process page. In general, process pages are reclaimed before global pages since it is important to retain data mapped to global pages for sharing by multiple processes, although it is not a limitation of the present invention.

Accordingly, a method and apparatus for reclaiming a page of physical memory in a computer system for subsequent mappings to a virtual address has been provided. The method includes two discrete steps; a first step wherein a clean list of physical pages whose data has been stored in a backing store is provided, and a second step wherein one of the physical pages is selected from the clean list for reclaiming to a requesting process. Pages are originally placed on the clean list in response to characteristics of the page including the cache page address of the page. Thus, an effort is made to provide clean pages that have cache page addresses that, if reclaimed, will provide an even distribution of cache page addresses both in use in the system and available for subsequent mappings. The page that is ultimately selected to be reclaimed is selected in response to system cache page address counters and process cache page address counters, such that the reclaimed page has a cache page address that results in an even distribution of cache page addresses on a system and process wide level.

Dynamic Cache Page Address Assignment

Using the processes and methods provided above, it can be ensured that, at least initially, cache page addresses are evenly distributed on a process and system wide basis. However, over time, as new and different processes are introduced into the computer system and as older processes are removed from the system it may occur that specific address mappings begin to incur an increased delay in execution. When an instruction begins to incur increased delay, an inference may be drawn that some other process has been introduced into the system that is causing thrashing at the same address as the instruction. By monitoring which physical pages are actively being referenced, it can be determined whether or not the physical address that was assigned to a virtual address is still the optimum mapping in terms of minimizing thrashing. When it is determined that a mapping is incurring excessive thrashing, the physical to virtual mapping is dynamically updated as described below.

Referring now to FIG. 15, a memory allocator 328 according to one embodiment of the disclosed system includes system counters 140, a free memory array 130, a page allocator 150, and an activity monitoring unit 350 coupled to process counters 360. The system counters 140, free memory array 130 and page allocator 150 operate as described with reference to FIG. 8. The activity monitoring unit 350 is coupled to the process counters 360 and, according to one embodiment of the disclosed system, is used to identify increased levels of activity at specific cache page addresses mapped within a given process.

The activity monitoring unit 350 includes a fault array 352, and is coupled to receive a page fault signal from the page table 129. As mentioned above, one reason that the page fault signal may become asserted is that a translation of a virtual address is not valid in the appropriate page table entry. The page fault signal may also become asserted as a result of other fault conditions that occur in the computer. Some of these fault conditions may be forced to occur by setting any one of the FOE, FOR or FOW bits in the page table entry associated with a virtual address. The setting of the FOE, FOR and FOW bits may be performed for any number of virtual addresses, for example during a context switch. In an example embodiment, the present system periodically sets some number of these fault bits in a predetermined set of page table entries mapping the virtual address space of a given process. When one of the virtual addresses mapped by one of the predetermined page table entries virtual address is subsequently referenced for a read, write or execute type function, the page fault signal is asserted if the corresponding fault bit is set in the PTE. For example, the instruction LOAD RX, (RY), loads data in register RX with data located at the address indicated in register RY. RX and RY are operands of the instruction. If all of the FOE, FOR and FOW bits are set for the virtual address stored in register RY, a fault occurs when the Load instruction is executed, when the data located at the address indicated by register RY is read, and when the data located at the address indicated by register RY is written to register RX.

There is a delay between when the page fault signal becomes asserted and when the fault is recognized and may be handled by the computer system. Accordingly, the virtual address that caused the fault to occur is not necessarily the virtual address storing the instruction that is currently executing when the fault is recognized by the computer system. Once a fault is recognized by the computer system, a software program referred to as a fault handler is invoked. According to one embodiment of the disclosed system, when the fault handler is invoked the last virtual address that was used to reference data is stored in the fault array 352 of the activity monitor 350. In an example embodiment, the fault array 352 would thus store a list of the most active virtual memory addresses in the computer system that are mapped by the predetermined set of page table entries.

Each time a virtual address is stored in the fault array 352, the activity monitor 350 examines the virtual address to identify the process and the cache page address mapped to that virtual address. Using the process and cache page address information, an index is provided to the process counters 360. The index is used to access the appropriate activity counter for the determined cache page address of the determined process in order to allow the activity counter to be incremented. Accordingly, each of the activity counters indicates the relative activity of a cache page address within a given process.

The activity counters can therefore be used to identify performance problems that potentially result from virtual to physical mappings. For example, if there is a given cache page address whose activity count is high, then virtual addresses that map to that given cache page address are frequently being used in the process. Since there may be many virtual addresses that map the same cache page address, a high activity count therefore indicates that there is a high potential that there is thrashing occurring at that cache page address. Accordingly, the activity counters may be used as a means for determining when to dynamically change virtual to physical mappings for a process in order to improve the performance of the process.

The activity monitor may change a mapping for a virtual address when one of the activity counters associated with one of the cache page addresses exceeds a predetermined threshold. When seeking to dynamically change a virtual to physical mapping, the remaining cache page address activity counters and process counters for that process are examined to select a cache page address having the lowest activity count and process count. By examining both the activity count and the process count, a replacement page of physical memory may be selected such that cache page addresses are evenly distributed throughout pages allocated to the process.

Figure 16A:
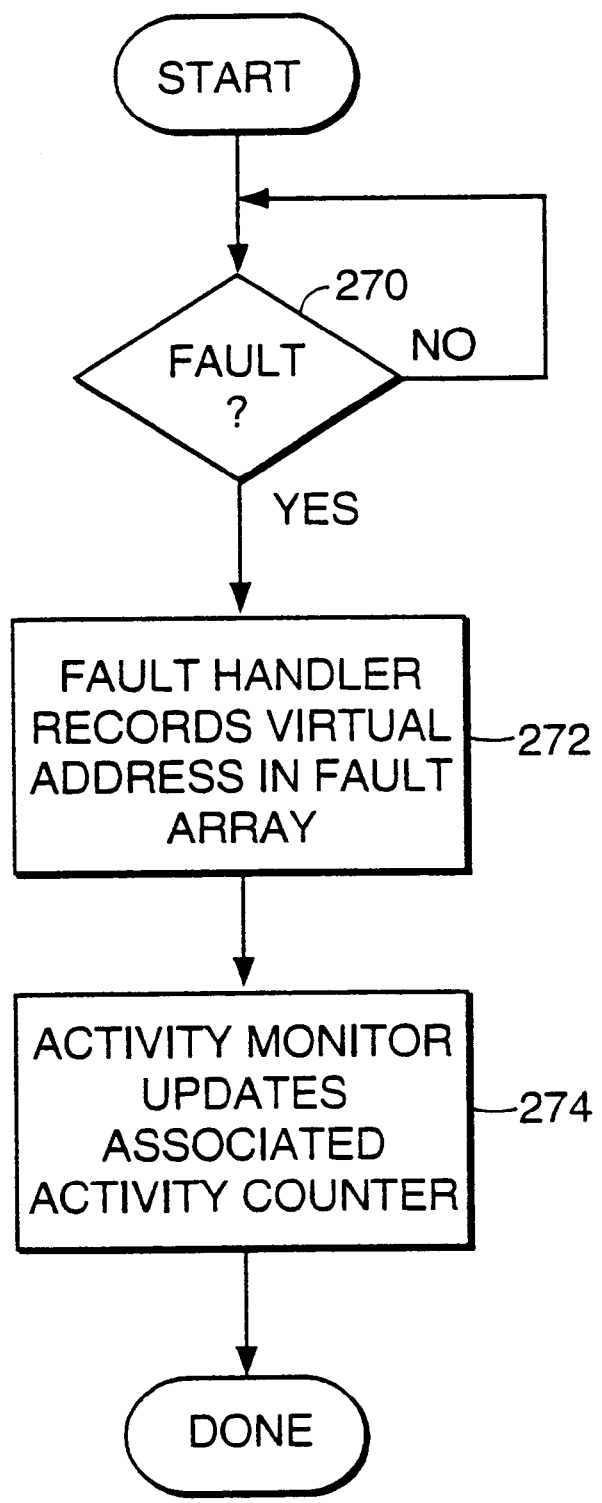
FIGS. 16A and 16B are flow diagrams illustrating a process for identifying and remapping virtual addresses incurring excess activity in the computer system of FIG. 15.
Figure 16B:
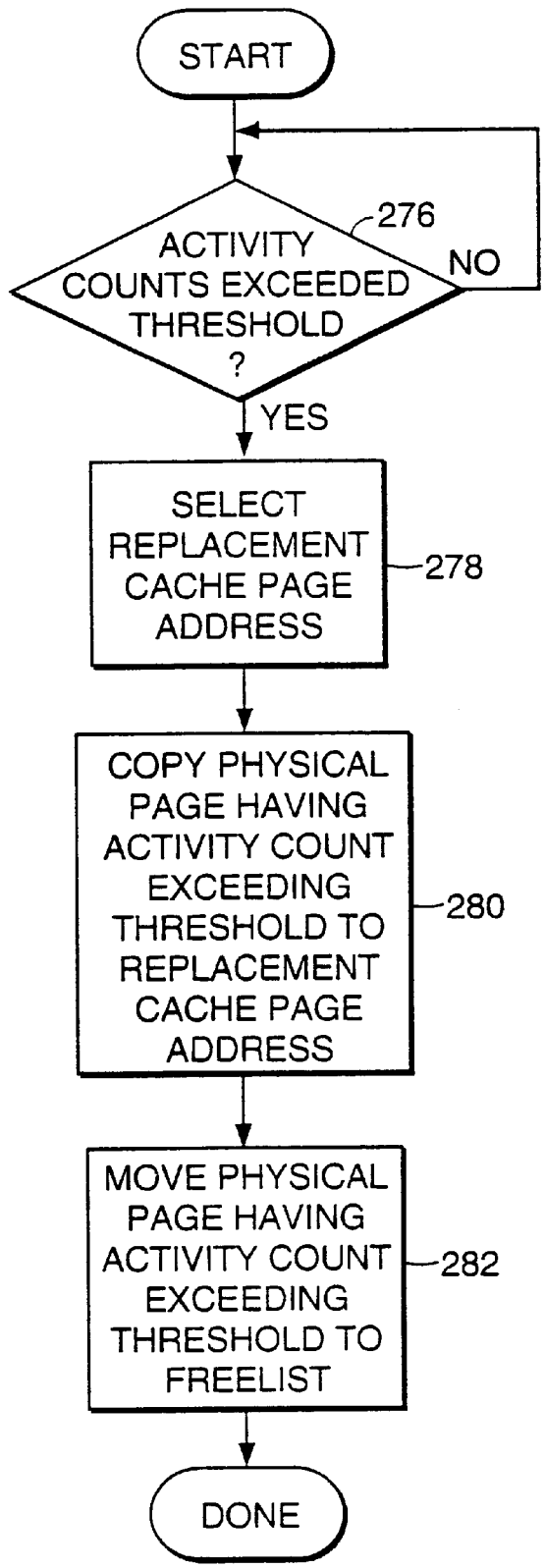

Referring now to FIGS. 16A and 16B, flow diagrams illustrating exemplary embodiments of the operation of the activity monitoring unit 350 for updating activity counters and dynamically changing virtual to physical mappings are shown.

FIG. 16A illustrates the operation and interaction between a fault handler routine and the activity monitor 350 when a fault occurs. At step 270, the process waits until a fault occurs. Once a fault occurs, at step 272 the fault handler program is invoked. One step that is taken by the fault handler is to record the virtual address currently being used to access data into the fault array 352. At step 274, when a new entry is written into the fault array 352, the activity monitor uses the virtual address to identify the currently executing process and to increment the activity count corresponding to the cache page address of the physical address mapped to the virtual address. Once the activity count corresponding to the cache page address is incremented, the process returns to step 270, awaiting the next assertion of the fault signal.

FIG. 16B illustrates the operation of the activity monitor 350 for dynamically changing a physical to virtual mapping. At step 276, the memory allocator 128 monitors the activity counts for each of the processes to determine when an activity count has exceeded a predetermined threshold. The predetermined threshold may be either a specific number, or alternatively, may be a relative difference between an expected activity count and the indicated activity count as provided by the counter. By measuring a relative difference it can be determined whether or not the change in activity was incurred as a result of thrashing at the address.

When any one of the activity counters exceeds its threshold, at step 278 the activity monitor 350 signals the page allocator to select a new cache page address for a replacement page of physical memory. The replacement cache page address corresponding to a replacement physical page may be selected using the procedures described with regard to FIG. 5 or FIG. 9, where both a preferable process cache page address and a preferable system cache page address are selected using the system counters and the process counters. At step 280, when the cache page address has been selected, a physical address of a page having the selected cache page address is retrieved from the free list and the data on the physical page associated with high cache page address activity count is copied to the replacement physical page. In addition, the page table entry for that virtual address is updated to map the virtual page to the replacement physical page whose address was retrieved from the free list. At step 282, the physical page associated with the cache page address having a high activity count is returned to the free list for later mapping to a different virtual page that potentially would not cause undue thrashing. After the page having the activity count exceeding its threshold value is moved to the free list at step 282, the process returns to step 276 where the monitoring of the activity counters and comparing them against the threshold values continues.

Because changing the mapping of a virtual page to a different address in physical memory requires copying of one page to another, dynamically changing the virtual to physical mappings may be quite time consuming. Accordingly, the threshold values for each of the activity counts should be selected such that the time delay associated with changing the page mapping is not incurred unless the performance advantages that result from the re-mapping outweigh the performance delay associated with the copy function.

Although the above processes have described a method wherein the virtual addresses that are executing in the system are monitored by periodically modifying PTEs to force faults to occur, other methods of monitoring virtual addresses may also be used. For example, a method where the virtual address of every cache miss is stored in an array could be used to easily identify those virtual addresses that incur frequent memory accesses. Other methods of virtual address tracking may also be used, and thus the present invention is not limited to the faulting mechanism described above.

Accordingly, a method for dynamically updating virtual to physical address mappings in order to improve thrashing monitors the activity of virtual addresses in the system and uses the activity of virtual addresses to increment cache page address activity counters associated with cache page addresses of physical pages mapped to the virtual addresses. The cache page address activity counters are monitored to identify those cache page addresses that are frequently being accessed within a process to identify potential performance problems, such as thrashing. When a cache page address activity count has exceeded a pre-determined threshold, a virtual address associated with that cache page address is mapped to a different physical address, having a different cache page address, for example in response to a fault occurring related to that virtual address. The new cache page address that is selected for remapping purposes is selected to maintain an even distribution of cache page addresses on a system and process level. The data on the physical page formerly mapped to the virtual address that was associated with a highly active cache page address is returned to a free list of the system, for use by another process. With such an arrangement, adjustments may be made to the virtual to physical translations during execution of a given process in order to improve the overall performance of the process and the overall system.

Thus, a method and apparatus for maintaining an even distribution of cache pages on a system and process wide level has been provided that may be utilized in a variety of different operations. The method may be extended to provide an even distribution of pages between different portions of a process, for example the local and global portions of a process. The method may also be extended to ensure that, when pages need to be reclaimed from processes as available pages for use by other processes, the reclaiming of the page is performed in such a way that an even distribution of pages is maintained both among the remaining processes and among the available pages in the system. In addition, the method and apparatus may be augmented to include logic for maintaining an even distribution of pages as processes are swapped into and out of the system. An alternative method and apparatus for maintaining an even distribution of cache page addresses within a data structure has been also been described.

Having described various embodiments of the invention, it should be apparent to those skilled in the art that the foregoing is merely illustrative and not limiting, having been presented by way of example only. Numerous modifications and other embodiments will be apparent to one of ordinary skill in the art in view of the specification and are contemplated as falling within the scope of the invention as defined by the appended claims and equivalent thereto.

I claim:

1. In a computer system having a cache memory, a method of re-mapping a virtual address to a physical address to improve performance comprising the steps of:

identifying a virtual address that is incurring delay in the computer system;

determining a physical address mapped to the virtual address, wherein the physical address includes a cache page address for the cache memory;

selecting an unmapped new physical address for mapping the virtual address, wherein the new physical address is selected to maintain a substantially even distribution of cache page addresses included in physical addresses of memory pages mapped to a plurality of virtual addresses in virtual address space;

copying data located at the physical memory page indicated by the determined physical address to the physical memory page indicated by the new physical address, and mapping the virtual address to the new physical address;

recording in a list, for each of plurality of faults that occur during operation of the computer system, virtual address that is being referenced in the computer system;

maintaining, for each of a plurality of cache page addresses, a count of the number of virtual addresses in the list that map to physical addresses including the cache page address; and selecting as the virtual address virtual address in the list associated with the cache page address having the highest count.

2. The method according to claim 1, wherein the step of determining the physical address corresponding to the at least one virtual address further comprises the steps of:

storing, in a table, a physical address for each of the virtual addresses of the computer system; and retrieving the physical address from the table responsive to value of the at least one virtual address.

3. The method according to claim 1, wherein the step of selecting a new physical address for mapping the virtual address further comprises the steps of:

maintaining, for each of a plurality of cache page addresses, a system counter indicating a number of physical addresses substantially including the respective cache page address that are available for mapping to virtual addresses;

maintaining, for a process executing in the computer system, for each of said plurality of cache page addresses, a process counter indicating a number of virtual addresses of the process that are mapped to physical addresses substantially including the respective cache page address;

selecting, from a list of available physical addresses, a first physical address responsive to the system count;

selecting, from the list of available physical addresses, a second physical address responsive to the process counts; and selecting either the first physical address or the second physical address as the new physical address responsive to a predetermined priority.

4. The method according to claim 2, wherein the step of selecting the first physical address selects the physical address substantially including the cache page address associated with the system counter having the highest count.

5. The method according to claim 2, wherein the step of selecting the second physical address selects the physical address substantially including the cache page address associated with the process counter having the lowest count.

6. In a computer system having a cache memory, a memory allocator comprising:

a plurality of system counters, one for each of a plurality of cache page addresses for the cache memory, each one of the plurality of system counters identifying a number of unmapped pages of a physical memory wherein physical memory address includes the respective cache page address;

a plurality of process counters corresponding to an associated process, each one of the plurality of process counters corresponding to a different cache page address and indicating the number of pages of the associated process that map to the cache page address;

a plurality of activity counters, each one of the activity counters corresponding to a cache page address and indicating a number of times that a virtual address associated with the cache page address is detected in the computer system; and a page allocator for mapping a physical address to a virtual address in response to the values of the each one of the plurality of system counters, the values of each one of the plurality of process counters, and the values of each one of the plurality of activity counters, such that there is a substantially even distribution of cache page addresses included in physical memory addresses mapped to a plurality of virtual addresses in the virtual address space;

means for faulting the computer system at random intervals;

means for recording a virtual address being referenced when the computer is faulted; and means for incrementing one of the plurality of activity counters, where the one of the plurality of activity counters that is incremented corresponds to a cache page address related to the virtual address being referenced.

7. The memory allocator according to claim 6, wherein the page allocator maps a physical address to a virtual address when one of the plurality of activity counters indicates that references to a virtual address mapped to a physical address substantially including the cache page address associated with that activity counter is incurring undesirable delay.

8. The memory allocator according to claim 6 further comprising:

a list of all of the unmapped pages of physical memory in the computer system; and a plurality of available lists, one for each one of the plurality of cache page addresses, wherein each one of the plurality of available lists maintains a list of unmapped pages of physical memory having physical addresses substantially including a corresponding cache page address.

9. In a computer system having a cache memory, a method of re-mapping a virtual address to a physical address to improve performance of the computer system, comprising the steps of:

(A) identifying at least one virtual address that is incurring delay in the computer system, said identifying including:

(i) recording in a list, for each of a plurality of faults that occur during operation of the computer system, a virtual address that is being referenced in the computer system;

(ii) maintaining for each of a plurality of cache page addresses, a count of the number of virtual addresses in the list that map to physical addresses substantially including the cache page address; and (iii) selecting as the at least one virtual address a virtual address in the list associated with the cache page address having the highest count;

(B) determining a physical address of a memory page corresponding to the at least one virtual address, wherein the physical address substantially includes a cache page address for the cache memory;

(C) selecting a new physical address for mapping the at least one virtual address, wherein the new physical address is selected to maintain a substantially even distribution of cache page addresses included in physical addresses of memory pages corresponding to a plurality of virtual addresses in the virtual address space; and (D) copying data located at the determined physical address to the memory page indicated by the new physical address.

10. In a computer system having a cache memory, a method of re-mapping a virtual address to a physical address to improve performance of the computer system, comprising the steps of:

(A) identifying at least one virtual address that is incurring delay in the computer system, said identifying including:

(B) determining a physical address of a memory page corresponding to the at least one virtual address, wherein the physical address substantially includes a cache page address for the cache memory;

(C) selecting a new physical address for mapping the at least one virtual address, wherein the new physical address is selected to maintain a substantially even distribution of cache page addresses included in physical addresses of memory pages corresponding to a plurality of virtual addresses in the virtual address space, said selecting a new physical address including:

maintaining, for each of a plurality of cache page addresses, a system counter indicating a number of physical addresses substantially including the respective cache page address that are available for mapping to virtual addresses;

maintaining, for at least one process executing in the computer system, for each of said plurality of cache page addresses, a process counter indicating a number of virtual addresses of the at least one process that are mapped to physical addresses substantially including the respective cache page address;

selecting, from a list of available physical addresses, a first physical address responsive to the system count;

selecting, from the list of available physical addresses, a second physical address responsive to the process counts; and selecting either the first physical address or the second physical address as the new physical address responsive to a predetermined priority; and (D) copying data located at the determined physical address to the memory page indicated by the new physical address.

11. The method according to claim 10, wherein the step of selecting, from the list of available physical addresses, the first physical address selects the physical address substantially including the cache page address associated with the system counter having the highest count.

12. The method according to claim 10, wherein the step of selecting, from the list, the second physical address selects the physical address substantially including the cache page address associated with the process counter having the lowest count.

13. In a computer system having a cache memory, a memory allocator comprising:

a plurality of system counters, one for each of a plurality of cache page addresses for the cache memory, each one of the plurality of system counters for identifying a number of free pages of a physical memory that map to the respective cache page address;

at least one plurality of process counters corresponding to at least one associated process, each one of the plurality of process counters corresponding to a different cache page address and indicating the number of pages of the associated process that map to the cache page address;

at least one plurality of activity counters, each one of the activity counters corresponding to a cache page address and indicating a number of times that a virtual address associated with the cache page address is detected in the computer system;

a page allocator for assigning a physical address to a virtual address in response to the values of each one of the plurality of system counters, the values of each one of the at least one plurality of process counters, and the values of each of the plurality of activity counters, the page allocator assigning the physical address to the virtual address when one of the plurality of activity counters indicates that references to a virtual address mapped to a physical address substantially including the cache page address associated with that activity counter is incurring undesirable delay;

means for faulting the computer system at random intervals;

means for recording a virtual address being referenced when the computer is faulted; and means for incrementing one of the plurality of activity counters, where the one of the plurality of activity counters that is incremented corresponds to a cache page address related to the virtual address being referenced.

* * * * *